(12) United States Patent
Hieda

(10) Patent No.: US 8,275,948 B2
(45) Date of Patent: Sep. 25, 2012

(54) MEMORY SHARING SYSTEM

(75) Inventor: Satoshi Hieda, Tokyo (JP)

(73) Assignee: NEC Corporation, Tokyo (JP)

( * ) Notice: Subject to any disclaimer, the term of this patent is extended or adjusted under 35 U.S.C. 154(b) by 696 days.

(21) Appl. No.: 12/042,927

(22) Filed: Mar. 5, 2008

(65) Prior Publication Data

US 2008/0222366 A1    Sep. 11, 2008

(30) Foreign Application Priority Data

Mar. 9, 2007    (JP) ................................ 2007-059889

(51) Int. Cl.
G06F 12/00    (2006.01)
G06F 13/00    (2006.01)

(52) U.S. Cl. ......................... 711/147; 711/150; 711/168

(58) Field of Classification Search ................... 711/147, 711/150, 168
See application file for complete search history.

(56) References Cited

U.S. PATENT DOCUMENTS

2005/0234966 A1 * 10/2005 Fujino et al. .................. 707/102

FOREIGN PATENT DOCUMENTS

| JP | 3-27439 A | 2/1991 |
|----|-----------|--------|
| JP | 4-25970 A | 1/1992 |
| JP | 4-227547 A | 8/1992 |
| JP | 8-328883 A | 12/1996 |
| JP | 11249916 A | 9/1999 |
| JP | 2003280912 A | 10/2003 |
| JP | 2004258698 A | 9/2004 |
| JP | 2005196602 A | 7/2005 |
| JP | 2006081119 A | 3/2006 |
| JP | 2006252554 A | 9/2006 |

OTHER PUBLICATIONS

Daniel P. Bovet et al., "Understanding the Linux Kernal, 2nd Edition", O'Reilly, Japan, Jun. 24, 2003, pp. 580-591.
Japanese Office Action for JP2007-059889 issued Jun. 21, 2011.

* cited by examiner

Primary Examiner — Midys Rojas

(57) ABSTRACT

A memory-use-information memory area stores therein a program ID, a request-source memory address, a request memory size which configure information for uniquely identifying a program file loaded into a storage area for virtual machine-A or storage area for virtual machine-B in association with a physical memory address. A memory reservation section uses, as the retrieval key, the program ID, request-source memory address, and request memory size of a program file corresponding to a memory reservation request to retrieval the memory-use-information memory area. When an entry that matches said retrieval key exists, the memory reservation section allows sharing of the memory area between a plurality of virtual machines.

34 Claims, 16 Drawing Sheets

FIG. 4

| PROGRAM ID | VIRTUAL MEMORY ADDRESS | REQUEST MEMORY SIZE | PHYSICAL MEMORY ADDRESS |
|---|---|---|---|
| 10000 | 0xA000 | 0x1000 | 0x10000 |
| 10006 | 0xB000 | 0x1000 | 0x20000 |

FIG. 11

| VIRTUAL MACHINE | DEVICE NUMBER | i-NODE NUMBER | PROGRAM ID |
|---|---|---|---|
| A | 2 | 100 | 10000 |
| A | 3 | 101 | 10016 |

MEMORY SHARING SYSTEM

This application is based upon and claims the benefit of priority from Japanese patent application No. 2007-059889 filed on Mar. 9, 2007, the disclosure of which is incorporated herein in its entirety by reference.

BACKGROUND OF THE INVENTION

1. Field of the Invention

The present invention relates to a memory sharing system, a method thereof, and a medium thereof and, more particularly, to a memory sharing system for sharing a memory between a plurality of computers, a method thereof, and a medium thereof.

2. Description of the Related Art

There is known a technique in which a plurality of virtual machines run on a single real computer. When a plurality of virtual machines run on a single real computer, independent memory areas are assigned to the respective virtual machines, whereby the number of memory areas proportional to the number of the virtual machines are required. Thus, when a plurality of virtual machines run on a small computer, such as an equipment-installed device, having limited hardware resources, a shortage of the memory area may occur.

There may be a case where the same program runs on a plurality of virtual machines running on the single real computer. However, the memory areas that the respective virtual machines use are reserved individually on a memory of the real computer. As a result, the same program file is redundantly loaded into the memory of the real computer. For example, it is assumed here that two Linux-based virtual machines run on the single real computer. In this case, there may be a case where a glibc library file of the same version is loaded into memory areas of the respective virtual machines. In view of this, a memory sharing system has been desired to share a program file loaded in a memory when the same program run on a plurality of virtual machines.

An example of a memory sharing system in an OS (Operating System) is described in a literature (DANIEL P. BOVET et al, "Understanding the Linux Kernel, 2nd Edition", O'Reilly Japan, 24 Jun. 2003, pp. 580 to 591). The "Understanding the Linux Kernel, 2nd Edition" describes a system in which a plurality of programs can refer to a file loaded in a memory. Although this technique is well known as a memory sharing technique in one OS, it cannot be applied to a memory sharing technique between a plurality of virtual machines. Hereinafter, the reason that this method cannot be applied to a memory sharing technique between a plurality of virtual machines will be described.

In the system described in the above literature, when a program running on the OS refers to a file, it identifies file data to be loaded into a memory based on an identifier (i-node number) assigned to a target file by the OS and an offset value in the file. When a reference request for the same file/same offset as that to which one program is currently referring is made by another program running on the same OS, the OS allows the another program to refer to the file data that has already been loaded into a memory. In this way, the memory sharing between a plurality of programs is performed.

It is assumed that the technique described in the above literature is applied to the memory sharing between a plurality of virtual machines. In this case, the respective virtual machines have different virtual storage units, whereby even if different virtual machines refer to a file having the same i-node number, there is a possibility that the target files differ from one another. For example, in the case where virtual machines A and B refer to a file "/sbin/init", it is likely that "/sbin/init" in the virtual storage unit of the virtual machine-A and "/sbin/init" in the virtual storage unit of the virtual machine-B differ from each other. Thus, even in the case where the same i-node number is assigned to two files, if a program file sharing is performed by regarding the two files as the same one, a program may fail to run. As described above, the memory sharing system described in the above literature cannot be used as a memory sharing system between a plurality of virtual machines.

An example of the memory sharing system between a plurality of virtual machines is described in Patent Publication JP-11-249916A and Patent Publication JP-2006-252554A. JP-11-249916A describes a system that performs memory area sharing between a plurality of virtual machines running on the single real computer. In this system, a memory is previously divided into some blocks, and a control table specifying "block that can be referred to only by a specific virtual machine" or "block that can be shared between a plurality of virtual machines" is prepared. When one virtual machine runs, a control program for managing memory blocks assigns a given memory block to the virtual machine based on the prepared control table.

JP-2006-252554A describes a system in which a memory area managed by one virtual machine is shared with another virtual machine. In this system, when a virtual machine-A receives a memory access request from a virtual machine-B the virtual machine-A maps a part of the memory area that the virtual machine-A itself manages onto the virtual machine-B which is the access request source. At this stage, the virtual machine-A manages the reference count of a page assigned to the virtual machine-B and can release the mapping when the reference count assumes zero.

A first problem is that when the same program runs on a plurality of virtual machines, a program file loaded into a memory cannot be shared between them. The reason is that although JP-11-249916A and JP-2006-252554A describe a method of sharing a memory area between a plurality of virtual machines, the above method cannot be applied to sharing of a program file between them. A second problem is that when the same program runs on both a virtual machine and a real computer, a program file loaded into a memory cannot be shared between them. The reason is that although the method of JP-11-249916A and JP-2006-252554A can be applied to a method of sharing a memory area between the virtual machine and the real computer, it cannot be applied to sharing of a program file between them.

SUMMARY OF THE INVENTION

The present invention has been made to solve the problems of the above related techniques, and an object thereof is to provide a memory sharing system which is capable of sharing a program file loaded into a memory between a plurality of virtual machines when the same program runs on the plurality of virtual machines. It is also an object of the present invention to provide a method thereof, and a medium storing the program for the sharing.

It is another object of the present invention to provide a memory sharing system which is capable of sharing a program file loaded into a memory between a real computer and a virtual machine when the same program runs on the real computer and the virtual machine. It is also an object of the present invention to provide a method thereof, and a medium storing therein the program of the sharing.

The present invention provides, in a first aspect thereof, a memory sharing system including: a plurality of computers; a memory including a plurality of memory areas assigned to respective the computers, the memory areas each being capable of loading thereon a program for operating a corresponding one of the computers; a memory-use-information memory area that stores therein association of a program ID of a loaded program with one of the memory areas loading the loaded program; a memory-use-information retrieval section that judges, upon issuing of a memory reservation request identifying a specific program from one of the computers, whether or not a specific program ID specifying the specific program is stored in the memory-use-information memory area; and a memory reservation section that allows, if the memory-use-information retrieval section judges existence of the specific program ID in the memory-use-information memory area, one of the memory areas loading thereon the specific program to be shared with the one of the computers that has issued the memory reservation request.

The present invention provides, in a second aspect thereof, a memory sharing method for sharing a memory area between a plurality of computers, the memory including a plurality of memory areas assigned to respective the computers, the memory areas each being capable of loading thereon a program for operating a corresponding one of the computers, the method including: judging, upon issuing of a memory reservation request identifying a specific program from one of the computers, whether or not a specific program ID specifying the specific program is stored in a memory-use-information memory area, which stores therein association of a program ID of a loaded program with one of the memory areas loading thereon the loaded program; and allowing, if the judging judges existence of the specific program ID in the memory-use-information memory area, one of the memory areas loading thereon the specific program to be shared with the one of the computers that has issued the memory reservation request.

The present invention provides, in a third aspect thereof, a computer readable medium encoded with a sharing program running on a CPU for executing sharing of a program loaded into a memory among a plurality of computers, the memory including a plurality of memory areas assigned to the respective computers, the memory areas each being capable of loading thereon a program for operating a corresponding one of the computers, the program being capable of causing the CPU to: judge, upon issuing of a memory reservation request identifying a specific program from one of the computers, whether or not a specific program ID specifying the specific program is stored in a memory-use-information storage, which stores therein association of a program ID of a loaded program with one of the memory areas loading the loaded program; and allow, if it is judged that the specific program ID is stored in the memory-use-information memory area, one of the memory areas loading thereon the specific program to be shared with the one of the computers that has issued the memory reservation request.

The above and other objects, features and advantages of the present invention will be more apparent from the following description, referring to the accompanying drawings.

BRIEF DESCRIPTION OF THE DRAWINGS

FIG. 4 is a table showing the concrete example of memory use information;

FIG. 11 is a table showing the concrete example of a program ID list;

DETAILED DESCRIPTION OF THE INVENTION

Figure 1:
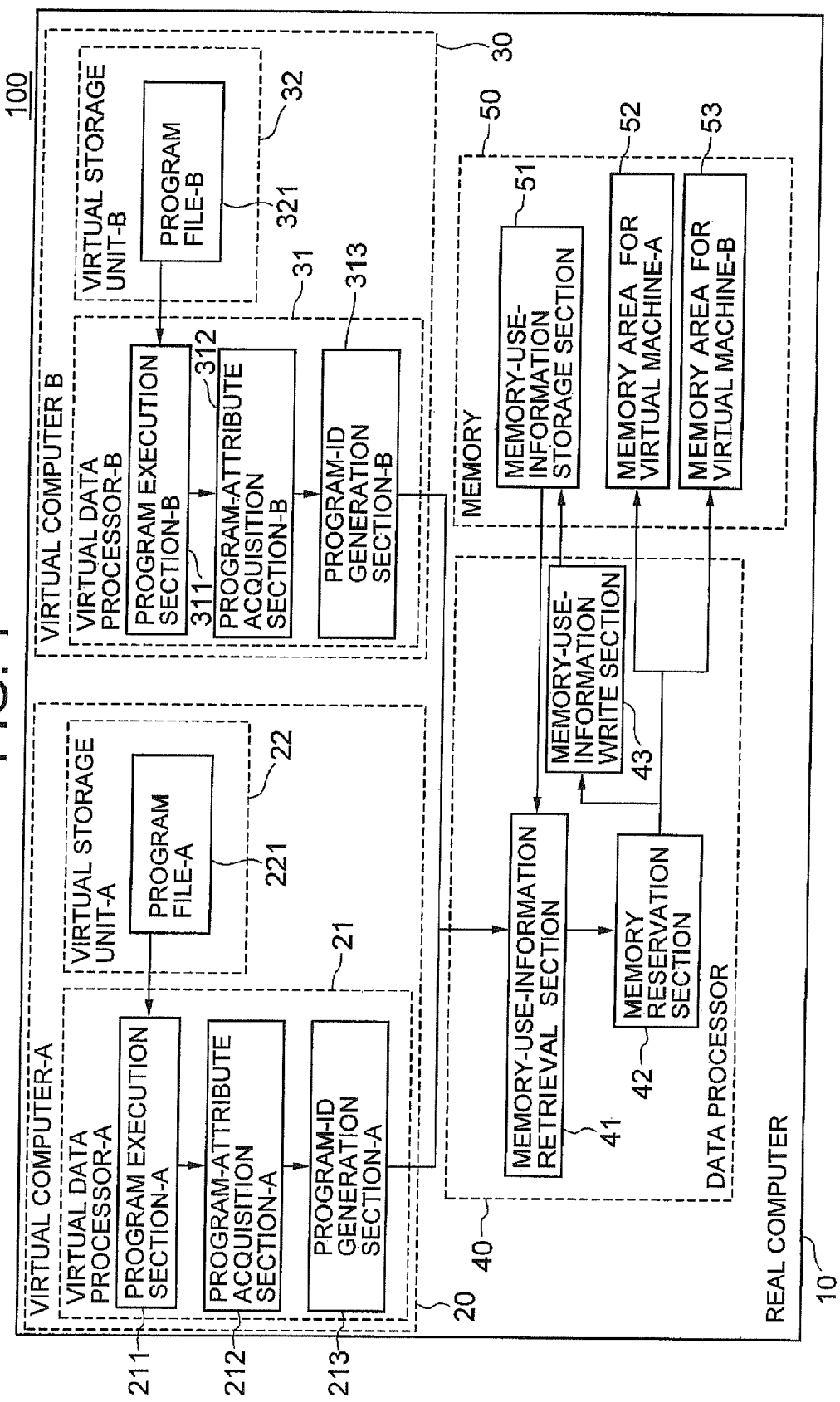
FIG. 1 is a block diagram showing the configuration of a memory sharing system according to a first embodiment of the present invention.

Hereinafter, exemplary embodiments of the present invention will be described in detail with reference to the accompanying drawings, wherein similar constituent elements are designated by similar reference numerals throughout the drawings. FIG. 1 shows the configuration of a memory sharing system according to a first embodiment of the present invention. The memory sharing system 100 of FIG. 1 includes, in a real computer or CPU 10, a virtual machine-A (virtual computer-A) 20, a virtual machine-B 30, a data processor 40 operating according to a program, and a memory 50. Although FIG. 1 shows a case where two virtual machines (virtual machines-A 20 and -B 30) run on the real computer 10, the number of virtual machines running on the real computer 10 is not limited thereto and, for example, three or more virtual machines may run on the real computer.

The virtual machine-A 20 includes a virtual data processor-A 21 operating according to a program and a virtual storage unit-A 22 for storing information. The virtual data processor-A 21 includes a program execution section-A 211, a program-attribute acquisition section-A 212, and a program-ID generation section-A 213. The virtual storage unit-A 22 is an imaginary storage device that the virtual machine-A 20 uses, and is actually the data stored in the real storage unit of the real computer 10. A variety of files and the like that the virtual machine-A 20 uses are stored in the virtual storage unit-A 22. Although only a program file-A 221 is shown in FIG. 1, the virtual storage unit-A 22 stores therein a variety of files used in the virtual machine-A 20, such as a system construction file and a document file.

The program execution section-A 211 executes a program that has been specified. In addition, when it is necessary to load the program file-A 221 into a memory, the program execution section-A 211 retrieves the request-source memory address and request memory size and thereafter, issues a memory reservation request. The request-source memory address is a memory address in a program for which a memory needs to be reserved at the program execution stage. In the OS, such as Linux, in which a virtual memory address space is prepared for each program, a virtual memory address in a program for which a memory address is required at the program execution stage corresponds to the request-source memory address. Alternatively, the request-source memory address may be a physical memory address corresponding to the virtual memory address. In the OS in which a virtual memory address space is not prepared for each program, a physical memory address in a program for which a memory needs to be reserved at the program execution stage corresponds to the request-source memory address. The request memory size is the size of a memory area required to load the program file into the memory. The memory reservation request sequentially propagates to other constituent elements in the system, and eventually, the memory sharing or a processing of reserving a new memory area is performed in a memory reservation section 42, which will be described later.

The program-attribute acquisition section-A 212 acquires the attribute information of the program file of a program from which a memory request has been issued. A feature unique to the program file is used as the attribute information. For example, the file size or time stamp of the program file is used. Further, the program file itself may be used as the attribute information. The program-ID generation section-A 213 generates the identifier (program ID) capable of uniquely identifying the program file based on the attribute information of the program file acquired by the program-attribute acquisition section-A 212. For example, the program-ID generation section-A 213 converts the attribute information into a hash value and sets this hash value as the program ID. If the program file includes information for uniquely identifying itself as the attribute information, the attribute information may be used as the program ID without modification.

The virtual machine-B 30 has a configuration similar to that of the virtual machine-A 20. That is, the virtual machine-B 30 includes a virtual data processor-B 31 and a virtual storage unit-B 32. The virtual data processor-B 31 includes a program execution section-B 311, a program-attribute acquisition section-B 312, and a program-ID generation section-B 313. The virtual storage unit-A 32 stores therein a program file-B 321. In FIG. 1, a symbol "A" is suffixed to the name of the constituent elements constituting the virtual machine-A 20 and symbol "B" is suffixed to the name of the constituent elements constituting the virtual machine-B 30 in order to differentiate them. However, the operations of the constituent elements in the virtual machine-B 30 are the same as those of the constituent elements in the virtual machine-A 20.

Both the virtual data processors A21 and B31 are actually the data processor 40 on the real computer 10. In order to clearly explain the operation of the virtual machines A20 and B30, the data processor is divided into three (virtual data processor-A 20, virtual data processor-B 30, data processor 40) in FIG. 1. Further, both the virtual storage units A22 and B32 are actually the data included in a storage unit of the real computer 10. In order to discriminate the data used in the virtual machine-A 20 and that in the virtual machine-B 30 from each other, the data is divided into two as the virtual storage units A22 and B32 in FIG. 1.

The memory 50 is a main storage unit in the real computer 10. The memory 50 includes a memory-use-information memory area 51, a memory area 52 for virtual machine-A and a memory area 53 for virtual machine-B. The memory-use-information memory area 51 stores therein memory use information in which the program ID, request-source memory address, and request memory size of a program loaded into a memory are made associated with the head memory address of a reserved memory area (hereinafter, referred to as reserved memory address). The memory area 52 for the virtual machine-A 20 is an area used when a memory reservation request is issued from the virtual machine-A 20. The memory area 53 for virtual machine-B is an area used when a memory reservation request is issued from the virtual machine-B 30.

The data processor 40 includes a memory-use-information retrieval section 41, a memory reservation section 42, and a memory-use-information write section 43. The memory-use-information retrieval section 41 uses, as the retrieval key, the program ID generated by the program-ID generation section-A 213 or program-ID generation section-B 313, request-source memory address, and request memory size to retrieve the memory use information and detects whether or not the corresponding entry exits When the corresponding entry exists in the memory use information, the memory reservation section 42 reserves a memory area corresponding to the request memory size starting from the reserved memory address descried in the entry and makes the reserved memory area shared between the virtual machines.

If the corresponding entry does not exist in the memory use information, the memory reservation section 42 newly reserves a memory area corresponding to the request memory size specified in the memory reservation request and loads the program file into the reserved memory. At this stage, in the case where the memory reservation request has been issued from the virtual machine-A 20, the memory reservation section 42 loads the program file into the memory area 52 for the virtual machine-A, whereas in the case where the memory reservation request has been issued from the virtual machine-B 30, the memory reservation section 42 loads the program file into the memory area 53 for the virtual machine-B. If the memory reservation section 42 has newly reserved a memory area, the memory-use-information write section 43 sets the head memory address of the reserved memory area as the reserved memory address, and writes the same as a new entry in the memory use information together with the request-source memory address and request memory size thereof.

Figure 2:
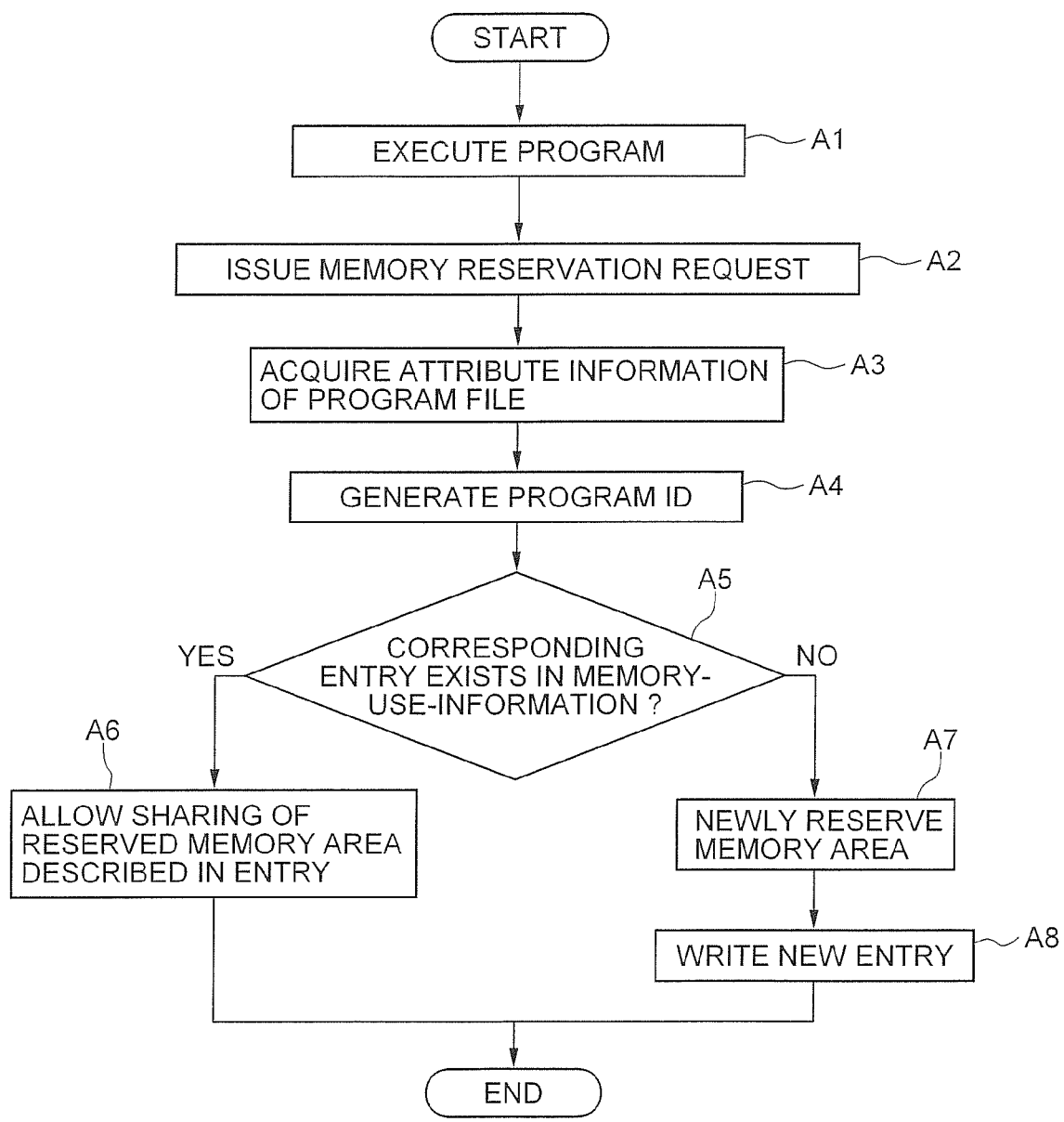
FIG. 2 is a flowchart showing the operation procedure of the memory sharing system according to the first embodiment.

FIG. 2 shows a flowchart of the processing of the memory sharing system 100. Hereinafter, with reference to FIG. 2, the processing in the step of running the program file-A 221 on the virtual machine-A 20 will be described. The processing in the step of running the program file-B 321 on the virtual machine-B 30 is the same as that in the step of running the program file-A 221 on the virtual machine-A 20. (that is, the program execution section-A 211 can be substituted by the program execution section-B 311, the program-attribute acquisition section-A 212 by the program-attribute acquisition section-B 312, the program-ID generation section-A 213 by the program-ID generation section-B 313, the virtual storage unit-A 22 by the virtual storage unit-B 32, and the program file-A 221 by the program file-B 321).

The program execution section-A 211 of the virtual machine-A 20 receives a request of execution of a program A and starts execution of the program file-A 221 (step A1). Thereafter, when it is necessary to load the program file-A 221 into the memory, the program execution section-A 211 obtains the request-source memory address and request memory size and issues a memory reservation request (step A2). Upon reception of the memory reservation request, the program-attribute acquisition section-A 212 acquires attribute information of the program file-A 221 corresponding to the program from which the memory request has been issued (step A3). The program-ID generation section-A 213 receives the attribute information of the program file-A 221 from the program-attribute acquisition section-A 212 and generates a program ID of the program file-A 221 based on the received attribute information (step A4).

The memory-use-information retrieval section 41 uses, as the retrieval key, the program ID generated by the program-ID generation section-A 213, request-source memory address, and request memory size to retrieval the memory use information in the memory-use-information memory area 51 for a corresponding entry (step A5). If a corresponding entry does not exist, the memory reservation section 42 newly reserves a memory area corresponding to the request memory size specified in the memory reservation request in the memory area 52 for virtual machine-A and loads the program file-A 221 into the reserved memory area (step A7). Thereafter, the memory-use-information write section 43 sets the head memory address of the reserved memory area as the reserved memory address and writes the same as a new entry in the memory use information together with the request-source memory address and request memory size (step A8).

If the corresponding entry exists in the memory use information, the memory reservation section 42 refers to the memory-use-information memory area 51 to reserve a memory area corresponding to the request memory size starting from the reserved memory address described in the entry and allows sharing of the reserved memory area (step A6). For example, in this sharing processing, access authorization to the memory area to be shared in the memory area 53 for virtual machine-B, which is reserved as a memory area for the virtual machine-B 30, is changed to allow the virtual machine-A 20 to access the memory area to be shared. Further, the access address of the virtual machine-A 20 and memory address on the real computer 10 are made associated with each other to allow the virtual machine-A 20 to access the program file-A 221 that has been loaded into the memory area 53 for virtual machine-B In the present embodiment, the memory-use-information retrieval section 41 uses, as the retrieval key, the program ID, request-source memory address, and request memory size to retrieve the memory use information for a corresponding entry and, when a corresponding entry exists in the memory use information, the memory reservation section 42 allows sharing of a memory area that has already been reserved. With this configuration, when the same program file runs on a plurality of virtual machines, the program file loaded into a memory can be shared between them. In particular, when the same program runs on a plurality of virtual machines on the same OS, it is often the case that the program ID, request-source memory address, and request memory size are the same between the virtual machines, thereby facilitating the sharing of a program file.

Figure 3:
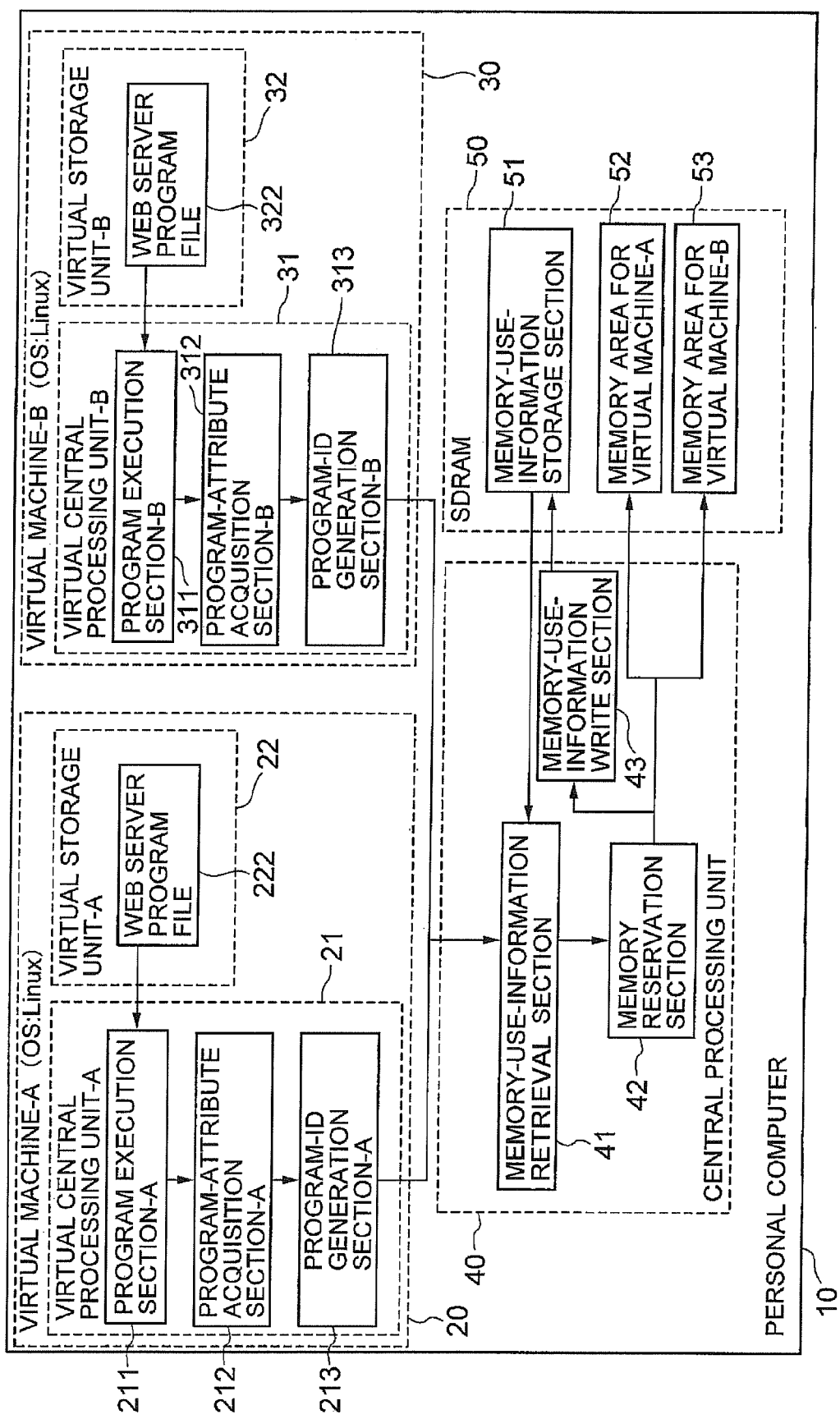
FIG. 3 is a block diagram showing the configuration of a memory sharing system according to a first example implementing the first embodiment.

The present embodiment will be further described with reference to a concrete example thereof. FIG. 3 shows the configuration of a memory sharing system according to the first example. In the first example, the real computer 10 is a personal computer, and the memory 50 is an SDRAM (Synchronous Dynamic Random Access Memory). The real computer 10 includes a virtual machine-A (virtual computer-A) 20 on which Linux is running and a virtual machine-B (virtual computer-B 30) on which Linux is running. The virtual machine-A 20 includes a virtual central processing unit-A (virtual data processor-A 21) having a function operating as a program execution section-A 211, a program-attribute acquisition section-A 212, and a program-ID generation section-A 213. The virtual machine-B 30 includes a virtual central processing unit-B (virtual data processor-B) 31 having a function operating as a program execution section-B 311, a program-attribute acquisition section-B 312, and a program-ID generation section-B 313.

Files and the like that the virtual machine-A 20 uses are stored in the virtual storage unit-A 22. Similarly, files and the like that the virtual machine-B 30 uses are stored in the virtual storage unit-B 32. The virtual storage units A22 and B32 store a Web server program file 222 and a Web server program file 322, respectively. The Web server program files 222 and 322 are actually the same program file. It is assumed here that the Web server program files 222 and 322 are entered into the same directory in the virtual storage units A22 and B32, and that device number "2" and i-node number "100" are assigned to the Web server program files 222 and 322 both in the virtual storage units A22 and B32. The term "device number of a program file" is an identifier of a file system where a program file is located on Linux, and the term "i-node number" is an identifier assigned to the program file in the file system.

The real computer 10 includes a central processing unit (data processor) 40 having a function operating as a memory-use-information retrieval section 41, a memory reservation section 42, and a memory-use-information write section 43. The SDRAM (memory) 50 includes therein memory use information (memory-use-information memory area) 51, a memory area for virtual machine-A (memory area 52 for virtual machine-A), and a memory area for virtual machine-B (memory area 53 for virtual machine-B). Both the virtual central processing units A21 and B31 are actually the central processing unit on the real computer 10.

FIG. 4 shows an example of the memory use information. The memory use information includes therein the program ID of a program on a virtual machine that has issued a memory reservation request, request source virtual memory address, request memory size, and a reserved physical memory address. The program ID is a value generated based on the attribute information of a program file and, in this example, a hash value of a program file is used as the program ID. The memory use information shown in FIG. 4 includes two entries, which are memory use information corresponding to the Web server program file 322 running on the virtual machine-B 30.

A case is assumed here where a page fault occurs in the step of executing the Web server program file 222 on the virtual machine-A 20 and therefore it is necessary to assign a memory having a size of 0x1000 to a virtual address space 0xA000 of the Web server program. In this case, the program execution section-A 211 finds the virtual memory address "0xA000" to which a memory (page) needs to be assigned in the virtual address space of the Web server program and the required memory size "0x1000" and thereafter, issues a memory reservation request.

The program-attribute acquisition section-A 212 finds a program file corresponding to the program that has issued the memory reservation request, that is, the device number "2" and i-node number "100" of the Web server program file 222 and acquires, based on the device number and i-node number, the attribute information of the program file. The program-ID generation section-A 213 then calculates a hash value of the program file based on the attribute information to generate a program ID "10000".

The memory-use-information retrieval section 41 uses, as the retrieval key, the program ID "10000" generated by the program-ID generation section-A 213, request-source memory address "0xA000", and request memory size "0x1000" to retrieval the memory-use-information memory area 51 and detects whether or not the corresponding entry exits In this case, the first entry in the table of FIG. 4 matches the retrieval key. That is, it becomes clear that a program to be loaded into the memory area 52 for virtual machine-A has already been loaded into the memory area 53 for virtual machine-B. In this case, the memory reservation section 42 reserves a memory area corresponding to the request memory size "0x1000" starting from the physical memory address "0x10000" described in the matched entry and performs sharing processing so as to allow the virtual machine-A to use this reserved memory area.

The memory reservation section 42 partitions the memory 50 in units of a page, and performs management of a use state of each page, management of access authority to each page, and association between a physical memory address in the virtual machines A20, A30 and a physical memory address in the real computer 10, and the like. In the sharing processing, a target page is found from the physical address in the memory use information 51, and then access authorization to the page is changed so as to allow the virtual machine-A 20 to access the page. Thereafter, the page is assigned as the physical memory in the virtual machine-A 20 to allow the virtual machine-A 20 to use a page assigned for the virtual machine-B 30.

Since the virtual storage units A22 and B32 have different file systems, there may be a case where different device numbers and different i-node numbers are assigned to the Web server program file 222 and Web server program file 322, even if virtual machines A20 and A30 have the same directory structure. However, since the Web server program files 222 and 322 are actually the same program file, the program ID generated based on the attribute information of the same program file is the same. Thus, by using the program ID unique to each program file, it is possible to share a program file loaded into a memory between a plurality of virtual machines.

Next, a case is assumed where a page fault occurs in the step of executing the Web server program file 222 on the virtual machine-A 20 and therefore it is necessary to assign a memory having a size of 0x1000 to a virtual address space 0xB000 of the Web server program. In this case, the program execution section-A 211 finds the virtual memory address "0xB000" to which a memory (page) needs to be assigned in the virtual address space of the Web server program and the required memory size "0x1000" and thereafter, issues a memory reservation request. The program-attribute acquisition section-A 212 finds device number "2" and i-node number "100" of the program that has issued the memory reservation request to acquire the target program file.

The program-ID generation section-A 213, which acquires the program file, calculates a hash value of the program file to generate a program ID "10000". The memory-use-information retrieval section 41 uses, as the retrieval key, the program ID "10000" generated by the program-ID generation section-A 213, request-source memory address "0xB000", and request memory size "0x1000" to retrieval the memory use information 51. In this case, there exists in the memory use information no entry that matches the retrieval key. Thus, the memory reservation section 42 newly reserves a memory area corresponding to the request memory size "0x1000" specified in the memory reservation request in the memory area 52 for virtual machine-A.

After the memory reservation section 42 has newly reserved the memory area, the memory-use-information write section 43 creates a new entry in the memory use information 51 and stores therein, as the new entry, the program ID "10000", request-source memory address "0xB000", and request memory size "0x1000" in association with the head memory address of the reserved physical memory. In this case, when a memory reservation request indicating the same program ID "10000", the same request-source memory address "0xB000", and the request memory size "0x1000" is issued from another virtual machine (virtual machine-B) 30, the memory reservation section 42 performs sharing of the program loaded into the memory area 52 for virtual machine-A, thereby allowing the sharing of the memory area reserved for the virtual machine-A 20.

Figure 5:
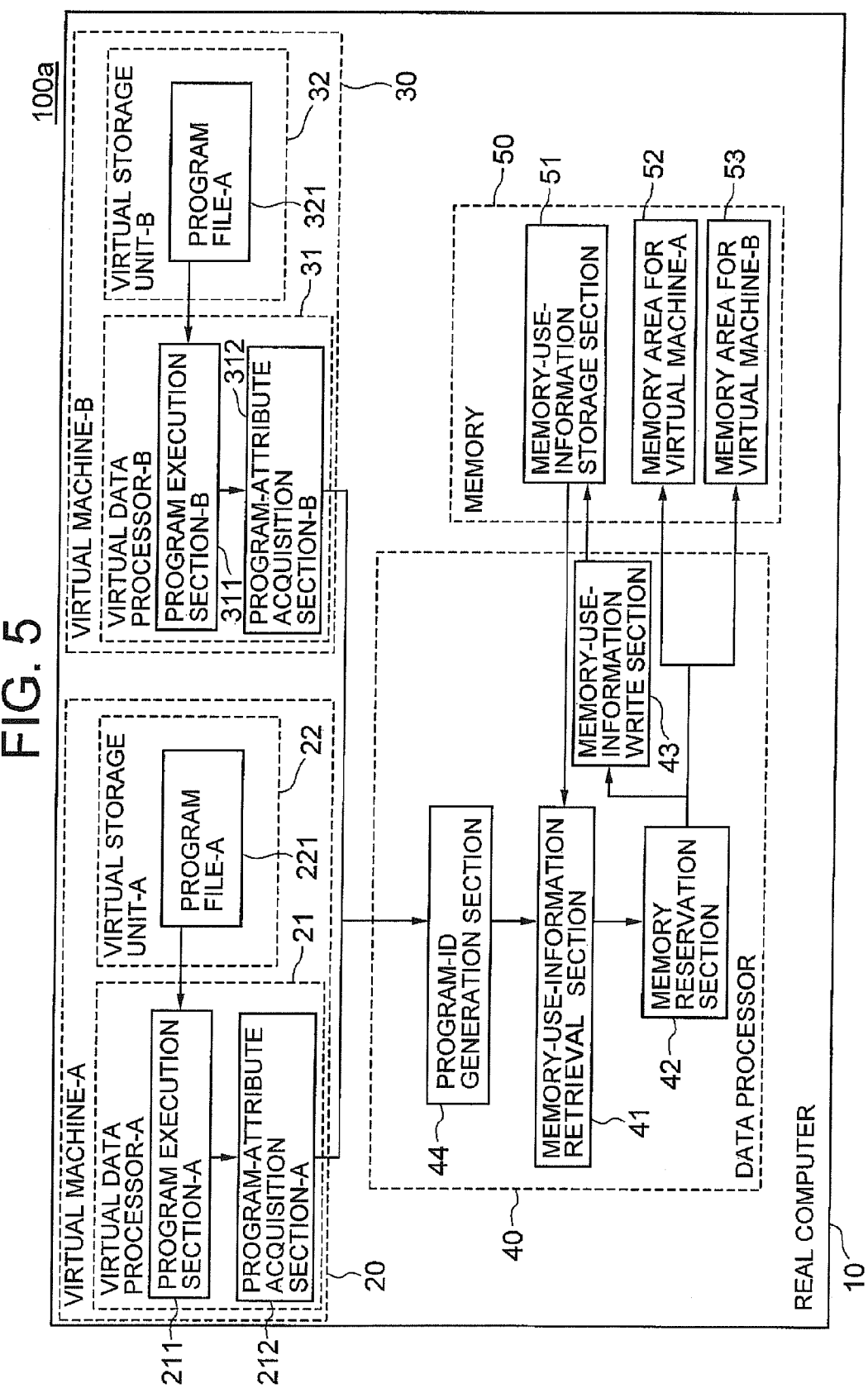
FIG. 5 is a block diagram showing the configuration of a memory sharing system according to a second embodiment of the present invention.

FIG. 5 shows the configuration of a memory sharing system according to a second embodiment of the present invention. A memory sharing system 100a according to the present embodiment differs from the memory sharing system 100 according to the first embodiment in that the program-ID generation section 44 is provided in the real computer 10 instead of the virtual machine. Other configurations are similar to those of the first embodiment. Further, the operation of the program-ID generation section 44 is similar to that of the program-ID generation section-A 213 and B313 shown in FIG. 1.

Figure 6:
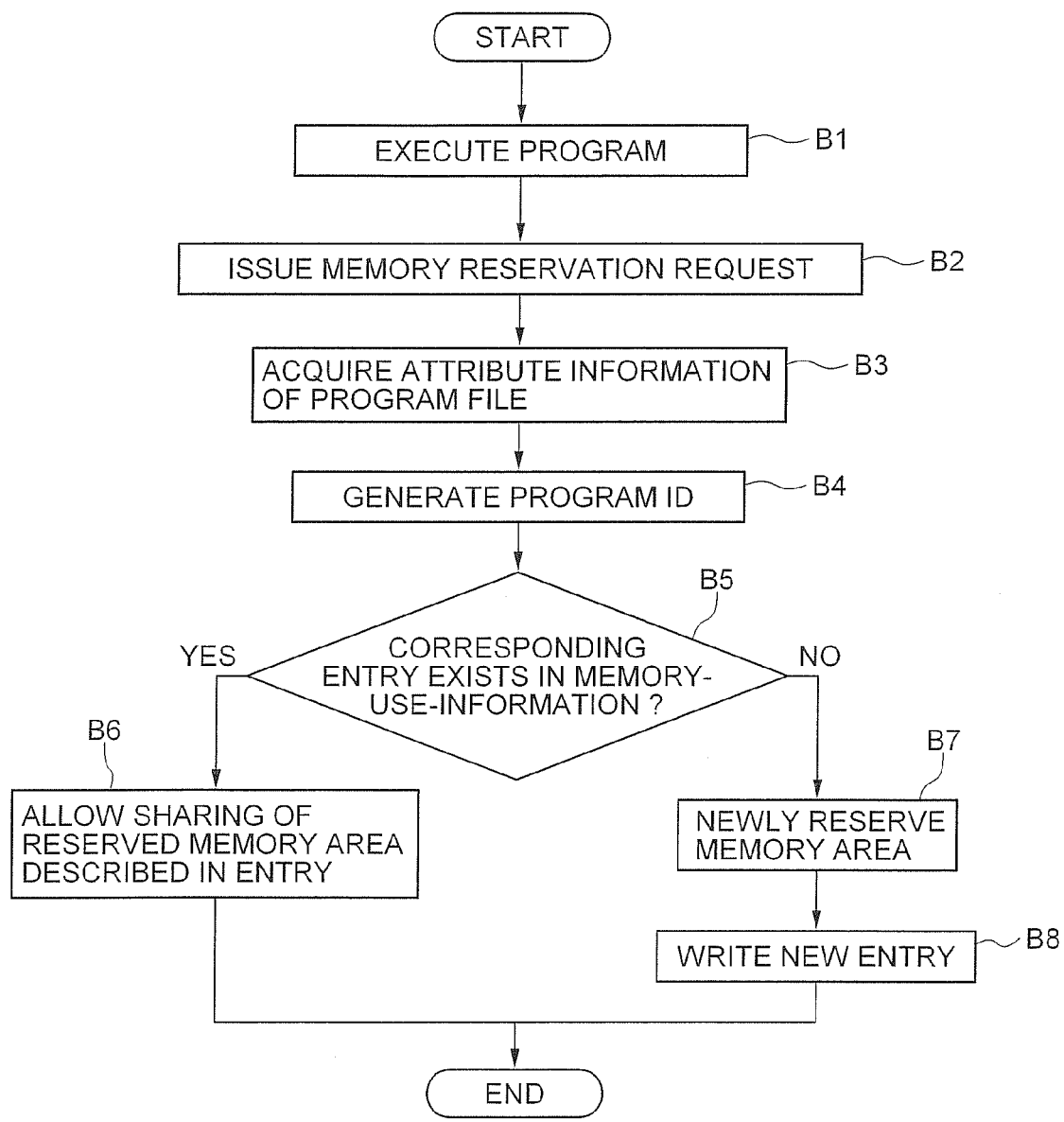
FIG. 6 is a flowchart showing the operation procedure of the memory sharing system according to the second embodiment.

FIG. 6 shows a flowchart of the processing of the memory sharing system 100a. The operation procedure (steps B1 to B8) of the memory sharing system according to the present embodiment is similar to the operation procedure (steps A1 to A8) of the memory sharing system according to the first embodiment shown in FIG. 2. The different point is step B4, where the program-ID generation section 44 in the real computer 10 generates the program ID of a program file corresponding to the memory reservation request generated in the virtual machine-A 20 and virtual machine-B 30.

In the present embodiment, the program-ID generation section 44 is shared between the virtual machines A20 and B30. With this configuration, the number of functions to be added to a virtual machine can be reduced. Other advantages are similar to those in the first embodiment. That is, when the same program file runs on a plurality of virtual machines, the program file loaded into a memory can be shared between the virtual machines.

Figure 7:
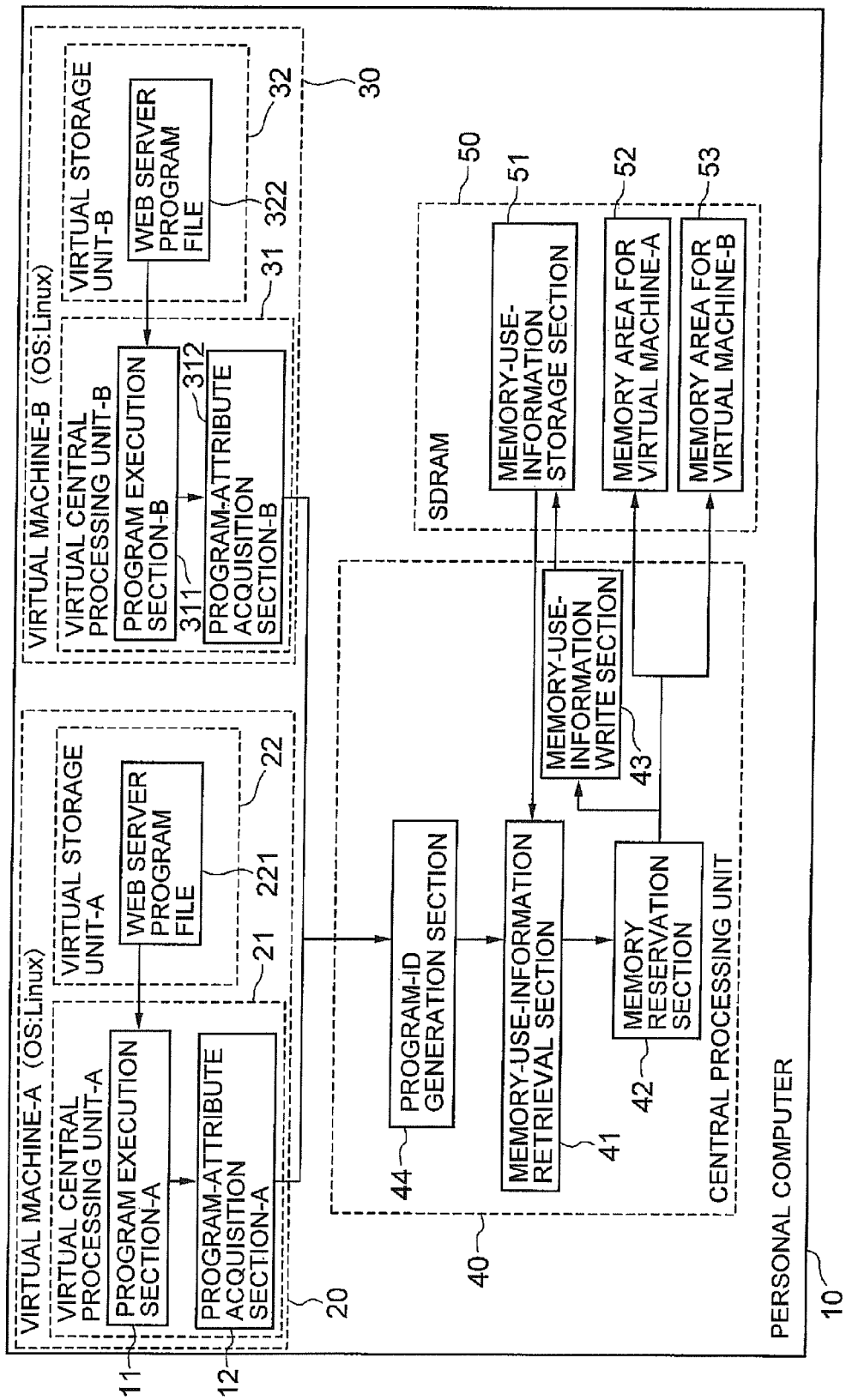
FIG. 7 is a block diagram showing the configuration of a memory sharing system according to a second example implementing the second embodiment.

The present embodiment will be described with reference to a concrete example thereof. FIG. 7 shows the configuration of a memory sharing system according to the second example. In the second example, the real computer 10 is a personal computer, and the memory 50 is an SDRAM. The real computer 10 includes a virtual machine-A (virtual computer-A) 20 on which Linux is running and a virtual machine-B (virtual machine-B) 30 on which Linux is running. The virtual machine-A 20 includes a virtual central processing unit-A (virtual data processor-A) 21 having a function operating as a program execution section-A 211 and a program-attribute acquisition section-A 212. The virtual machine-B 30 includes a virtual central processing unit-B (virtual data processor-B) 31 having a function operating as a program execution section-B 311 and a program-attribute acquisition section-B 312. The virtual central processing units A21 and B31 are actually a central processing unit on the real computer 10.

Files and the like that the virtual machine-A 20 uses are stored in the virtual storage unit-A 22. Similarly, files and the like that the virtual machine-B 30 uses are stored in the virtual storage unit-B 32. The virtual storage units A22 and B32 store a Web server program file 222 and a Web server program file 322, respectively. The Web server program files 222 and 322 are actually the same program file. It is assumed that the Web server program files 222 and 322 are entered in the same directory in the virtual storage units A22 and B32 and that device number "2" and i-node number "100" are assigned to the Web server program files 222 and 322 both in the virtual storage units A22 and B32.

The real computer 10 includes a central processing unit (data processor) 40 having a function operating as a memory-use-information retrieval section 41, a memory reservation section 42, a memory-use-information write section 43, and a program-ID generation section 44. The SDRAM (memory) 50 includes therein memory use information (memory-use-information memory area) 51, a memory area for virtual machine-A (memory area 52 for virtual machine-A), and a memory area for virtual machine-B (memory area 53 for virtual machine-B). The memory use information 51 stores therein the memory use information shown in FIG. 4. Two entries included in the memory use information of FIG. 4 are memory use information corresponding to the Web server program file 322 running on the virtual machine-B 30.

A case is assumed here where a page fault occurs in the step of executing the Web server program file 222 on the virtual machine-A 20, and therefore it is necessary to assign a memory having a size of 0x1000 to a virtual address space 0xA000 of the Web server program. In this case, the program execution section-A 211 finds the virtual memory address "0xA000" to which a memory (page) needs to be assigned in the virtual address space of the Web server program and the required memory size "0x1000", and thereafter, issues a memory reservation request.

The program-attribute acquisition section-A 212 acquires the device number "2" and i-node number "100" of a program that has issued the memory reservation request and acquires the attribute information of the program file. The program-ID generation section 44 in the data processor 40 receives the attribute information from the program-attribute acquisition section-A 212 in the virtual machine-A 20 and calculates a hash value of the program file to generate a program ID "10000". The memory-use-information retrieval section 41 uses, as the retrieval key, the program ID "10000" generated by the program-ID generation section 44, request-source memory address "0xA000", and request memory size "0x1000" to retrieval the memory use information 51 and detects whether or not the corresponding entry exists.

In this case, the first entry in the table of FIG. 4 matches the retrieval key in the retrieval by the memory-use-information retrieval section-A 212. That is, it becomes clear that a program to be loaded into the memory area 52 for virtual machine-A has already been loaded into the memory area 53 for virtual machine-B In this case, the memory reservation section 42 reserves a memory area corresponding to the request memory size "0x1000" starting from the physical memory address "0x10000" described in the matched entry and performs sharing processing so as to allow the virtual machine-A to use this reserved memory area.

Figure 8:
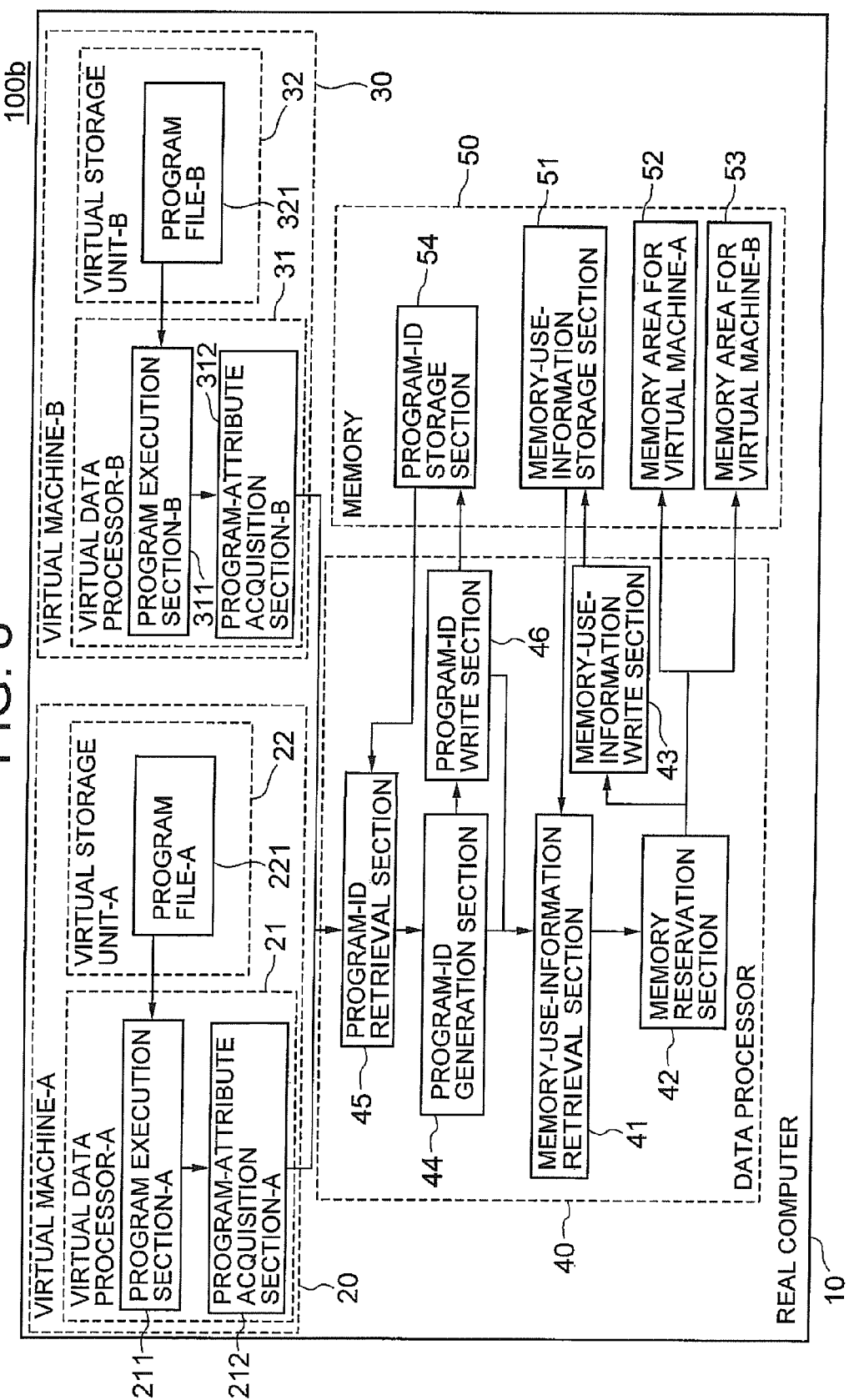
FIG. 8 is a block diagram showing the configuration of a memory sharing system according to a third embodiment of the present invention.

FIG. 8 shows the configuration of a memory sharing system according to a third embodiment of the present invention. A memory sharing system 100b according to the present embodiment includes a program-ID retrieval section 45, a program-ID write section 46, and a program-ID memory area 54 in addition to the configuration of the second embodiment shown in FIG. 5. The program-ID memory area 54 stores therein an association between a program file and program ID as a program ID list. More specifically, the program-ID memory area 54 stores therein a program ID generated by the program-ID generation section 44 and information identifying the program file corresponding to the program ID, in association with each other. The information identifying the program file includes, e.g., the identifier, device number, and i-node number of the virtual machine. The program ID list functions as a cache mechanism for the program-ID generation section 44.

The program-ID retrieval section 45 receives the program-file identification information from the program-attribute acquisition section-A 212 or program-attribute acquisition section-B 321 and uses the received program-file identification information as the retrieval key to retrieval the program ID list stored in the program-ID memory area 54. If a corresponding entry does not exist, the program-ID generation section 44 generates the program ID of the program file based on the attribute information acquired from the program-attribute acquisition section-A 212 or program-attribute acquisition section-B 312. After the program ID has been generated by the program-ID generation section 44, the program-ID write section 46 associates the generated program ID with the program-file identification information and stores them in the program-ID memory area 54 as an entry. If the corresponding entry exists, the program-ID retrieval section 45 acquires the program ID described in the existing entry and delivers the same to the program-ID generation section 44.

Figure 9:
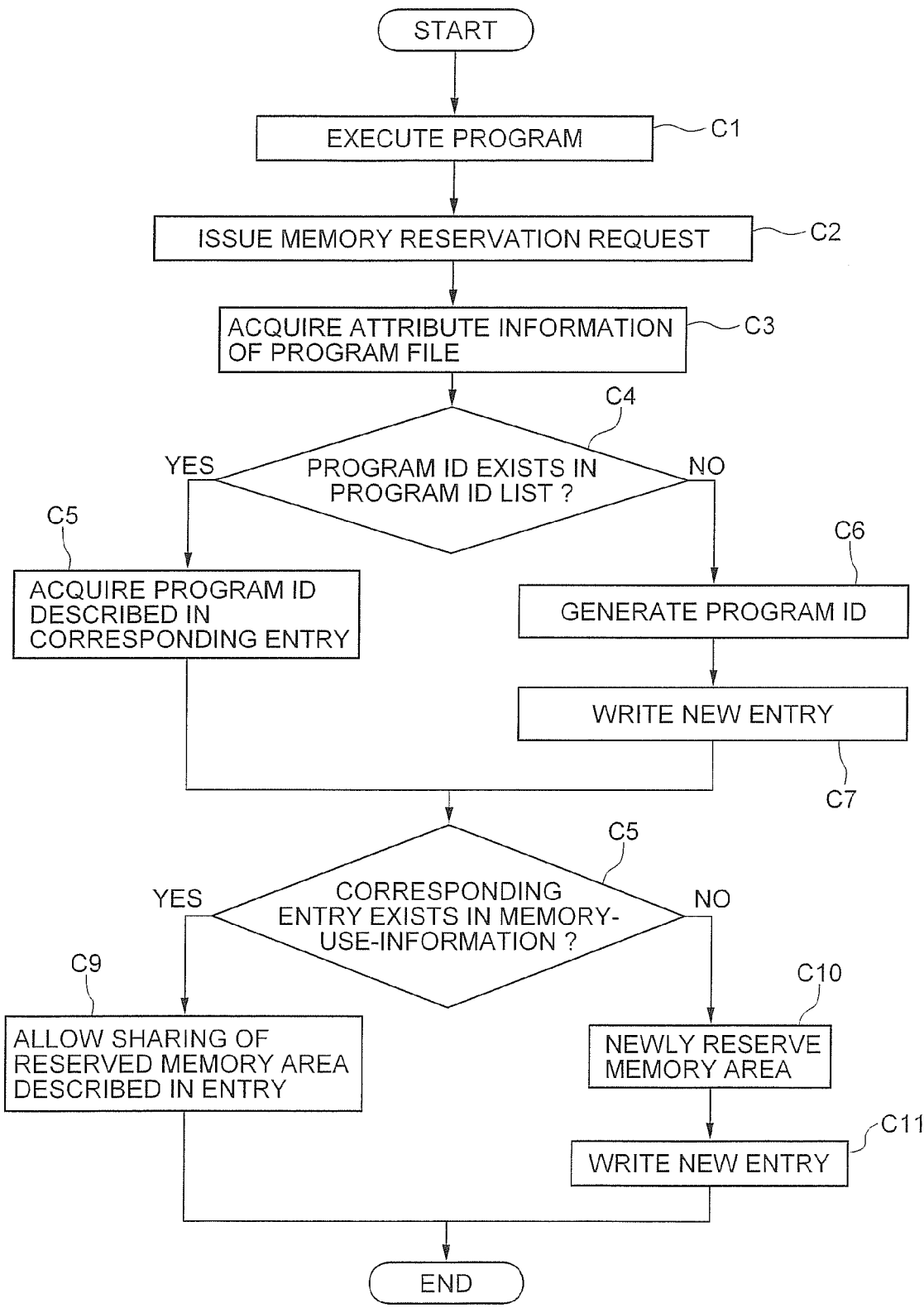
FIG. 9 is a flowchart showing the operation procedure of the memory sharing system according to the third embodiment.

FIG. 9 shows a flowchart of the processing of the memory sharing system 100b. The program execution section-A 211 executes a program (step C1). When it is necessary to load the program file-A 221 into a memory, the program execution section-A 211 finds the request-source memory address and request memory size and issues a memory reservation request (step C2). The program-attribute acquisition section-A 212 acquires the program-file identification information (device number and i-node number) of the program file-A 221 corresponding to the program from which a memory request has been issued, and thereafter acquires the attribute information of the program file-A 221 (step C3). The operation up to this stage is similar to the operation from the steps A1 to A3 shown in FIG. 2.

The program-ID retrieval section 45 receives the program-file identification information from the program-attribute acquisition section-A 212 and uses the received program-file identification information as the retrieval key to retrieval the program ID list stored in the program-ID memory area 54 (step C4). When a corresponding entry exists, the program-ID generation section 44 acquires the program ID of the corresponding entry from the program-ID memory area 54 via the program-ID retrieval section 45 (step C5). When the corresponding entry does not exist, the program-ID generation section 44 generates the program ID based on the attribute information of the program file acquired by the program-attribute acquisition section-A 212 (step C6).

After the program-ID generation section 44 has generated the program ID, the program-ID write section 46 associates the generated program ID with the program-file identification information, and writes them as a new entry in the program-ID memory area 54 in the memory 50 (step C7). The program ID of the program file having a program ID which has already been generated as described above will be fetched from the program-ID memory area 54 in the future operation. The subsequent operation (steps C8 to C11) is similar to the operation of steps A5 to A8 shown in FIG. 2.

In the present embodiment, the program ID generated by the program-ID generation section 44 is stored in the program-ID memory area 54 and, when the program ID to be generated by the program-ID generation section 44 has already been stored in the program-ID memory area 54, the stored program ID is used. This configuration eliminates the need to generate the program ID by using the program-ID generation section 44 each time a memory reservation request is issued, thereby skipping the program ID generation processing. Other advantages are similar to those in the second embodiment.

Figure 10:
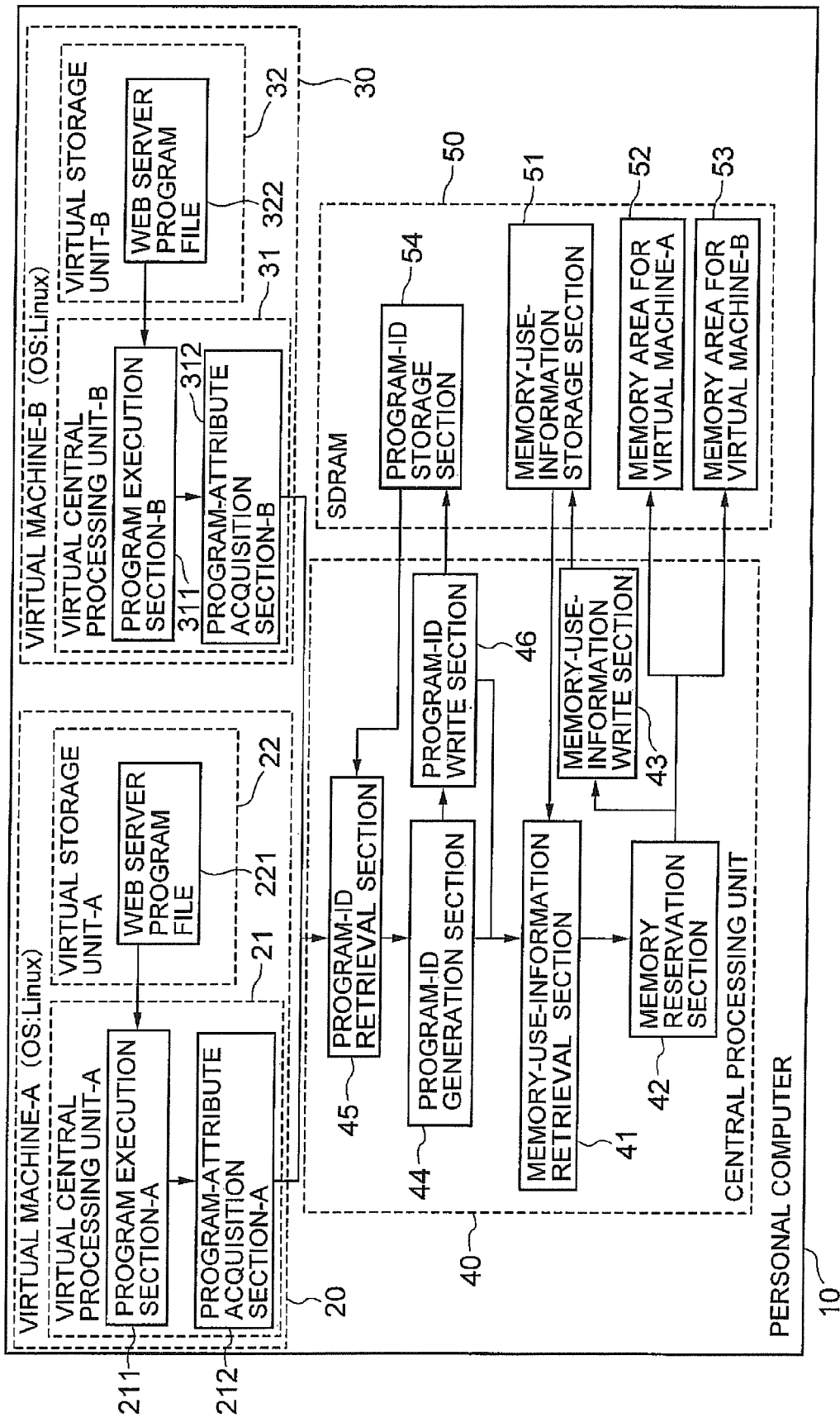
FIG. 10 is a block diagram of a memory sharing system according to a third example implementing the third embodiment.

A concrete example will be described hereinafter. FIG. 10 shows the configuration of a memory sharing system according to a third example. In the third example, the real computer 10 is a personal computer, and the memory 50 used therein is an SDRAM. The real computer 10 includes a virtual machine-A (virtual computer-A) 20 on which Linux is running and a virtual machine-B (virtual computer-B 30) on which Linux is running. The configurations of the virtual machines A20 and B30 are similar to those in the second example. The real computer 10 includes a central processing unit (data processor 40) having a function operating as a memory-use-information retrieval section 41, a memory reservation section 42, a memory-use-information write section 43, a program-ID generation section 44, a program-ID retrieval section 45, and a program-ID write section 46.

The SDRAM (memory 50) stores therein memory use information (memory-use-information memory area 51), a memory area for virtual machine-A (memory area 52 for virtual machine-A), a memory area for virtual machine-B (memory area 53 for virtual machine-B), and a program ID list (program-ID memory area 54). An example of information stored in the program ID list 54 is shown in FIG. 11. As shown in FIG. 11, the program ID list 54 stores the identifier, device number, and i-node number of the virtual machine in association with the program ID.

A case is assumed where a page fault occurs in the step of executing the Web server program file 222 on the virtual machine-A 20 and therefore it is necessary to assign a memory having a size of 0x1000 to a virtual address space 0xA000 of the Web server program. In this case, the program execution section-A 211 finds the virtual memory address "0xA000" to which a memory (page) needs to be assigned in the virtual address space of the Web server program 222 and required memory size "0x1000", and thereafter, issues a memory reservation request. The program-attribute acquisition section-A 212 acquires the device number "2" and i-node number "100" as the program-file identification information, and thereafter acquires the attribute information of the program file.

The program-ID retrieval section 45 receives the program-file identification information (virtual machine "A", device number "2", and i-node number "100") from the program-attribute acquisition section-A 212, and uses the received program-file identification information as the retrieval key to retrieval the program ID list 54. The retrieval key including the virtual machine "A", device number "2", and i-node number "100") matches the first entry in the program ID list 54 shown in FIG. 11, and the program-ID retrieval section 45 acquires the program ID "10000" of the first entry and delivers the same to the program-ID generation section 44. In this case, the program-ID generation section 44 does not generate the program ID, and delivers the received program ID to the memory-use-information retrieval section 41.

The memory-use-information retrieval section 41 uses, as the retrieval key, the program ID "10000" generated by the program-ID generation section 44, request-source memory address "0xA000", and request memory size "0x1000" to retrieval the memory use information 51, and detects whether or not the corresponding entry exits In this case, the first entry in the table of FIG. 4 matches the retrieval key. Then, the memory reservation section 42 reserves a memory area corresponding to the request memory size "0x1000" starting from the physical memory address "0x10000" described in the matched entry and performs sharing processing so as to allow the virtual machine-A 20 to use this reserved memory area.

Figure 12:
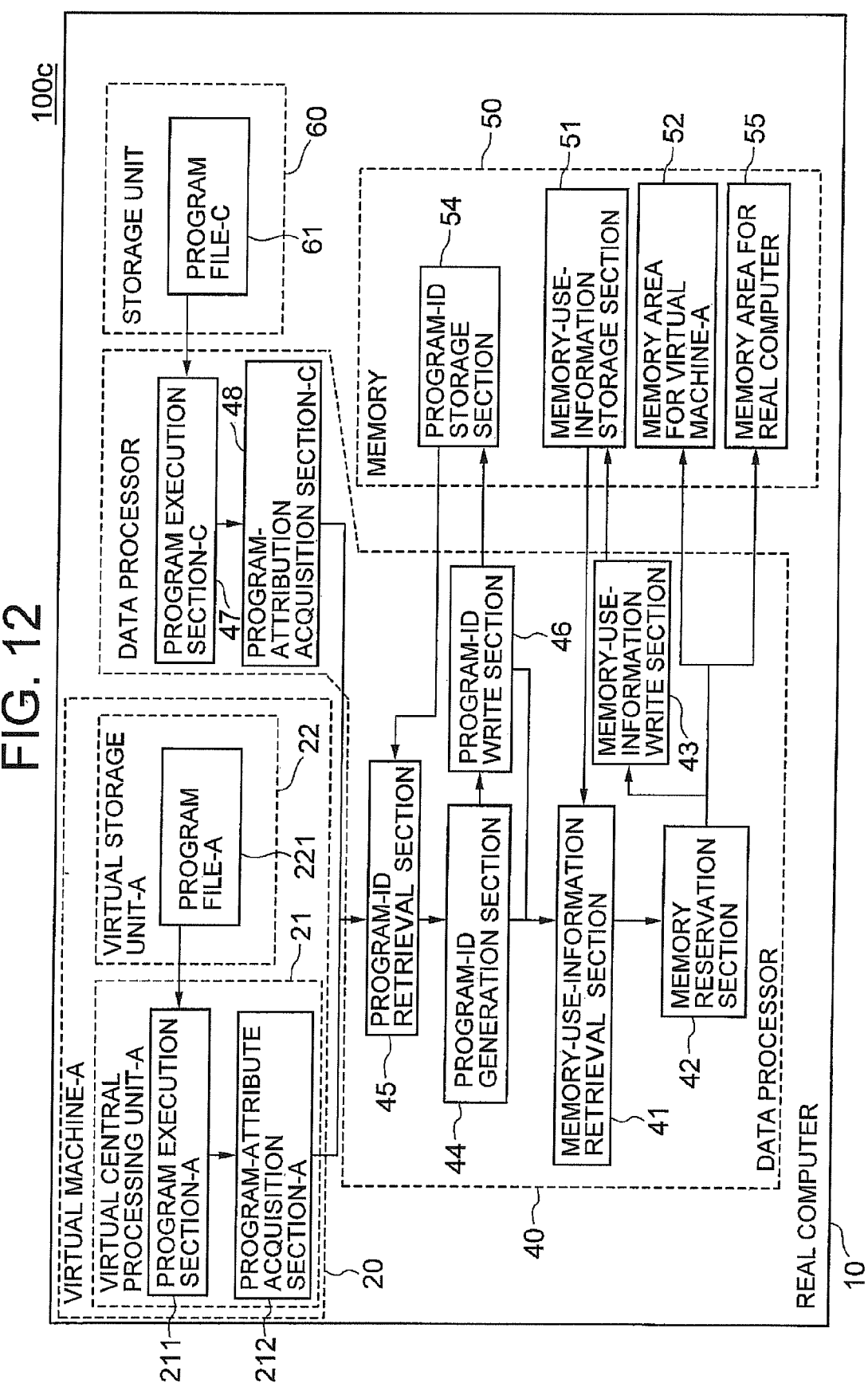
FIG. 12 is a block diagram showing the configuration of a memory sharing system according to a fourth embodiment of the present invention.

FIG. 12 shows the configuration of a memory sharing system according to a fourth embodiment of the present invention. The memory sharing system 100c according to the present embodiment differs from the memory sharing system 100b according to the third embodiment shown in FIG. 8 in that the data processor 40 of the real computer 10 includes a program execution section 47 and a program-attribute acquisition section C48 and that a program loaded into the memory 50 is shared between the real computer 10 and the virtual machine-A 20. The operation of the program execution section C47 and program-attribute acquisition section C48 is similar to that of the program execution section-A 211 and program-attribute acquisition section-A 212 in the virtual machine-A 20.

A storage unit 60 is an external storage unit that the real computer 10 uses. Files and the like that the real computer 10 uses are stored in the storage unit 60. Although only a program file-C61 is shown in FIG. 12, the storage unit 60 stores therein a variety of files used on the real computer 10, such as a system construction file and a document file. The memory 50 includes a memory area 55 for real computer. The memory area 55 for real computer is a memory area that the real computer 10 uses at the time when the computer 10 has issued a memory reservation request.

Figure 13:
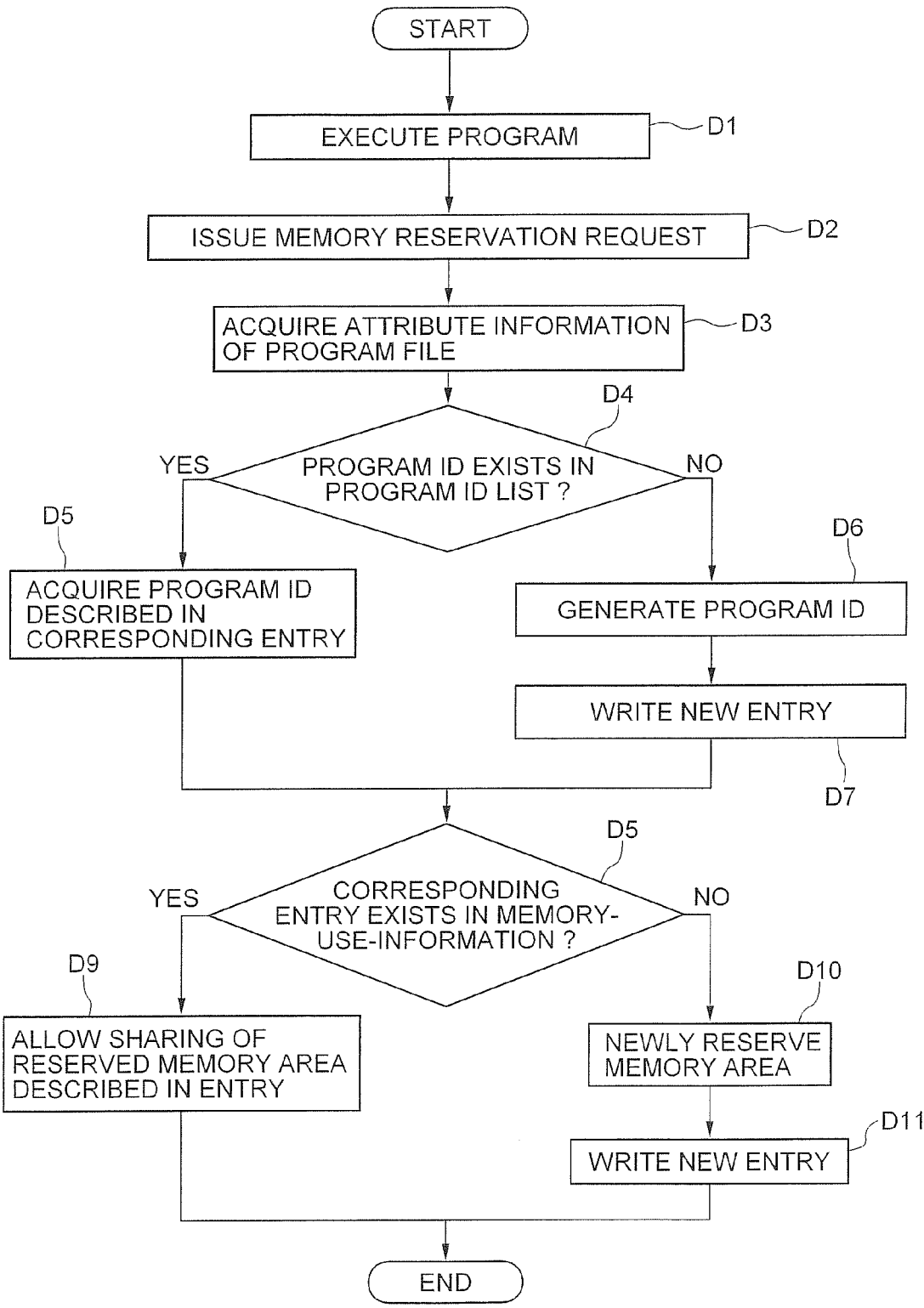
FIG. 13 is a flowchart showing the operation procedure of the memory sharing system according to the fourth embodiment.

FIG. 13 shows a flowchart of the processing of the memory sharing system 100c. The operation (steps D1 to D11) of the memory sharing system 100c according to the present embodiment is similar to the operation of steps C1 to C11 shown in FIG. 9 in the third embodiment except that the program execution section-B 311 and program-attribute acquisition section-B 312 are replaced by the program execution section C47 and program-attribute acquisition section C48, respectively, and that the virtual storage unit-B 32 is replaced by the storage unit 60. With this operation, a program file loaded into the memory can be shared between the memory area 52 for virtual machine and memory area 55 for real computer.

In the present embodiment, the memory-use-information retrieval section 41 uses, as the retrieval key, the program ID, request-source memory address, and request memory size to retrieval the memory use information 51 for a corresponding entry, and when the corresponding entry exists, the memory reservation section 42 allows sharing of a memory area that has already been reserved. With this configuration, when the same program file runs on the virtual machine-A 20 and real computer 10, a program file loaded into a memory can be shared therebetween. In particular, when the same-type OS runs on the virtual machine-A 20 and real computer 10, and if the same program runs on the virtual machine-A 20 and real computer 10, it is often the case that the program ID, request-source memory address, and request memory size are the same therebetween, whereby the sharing of a program file is encouraged. Other advantages are similar to those in the third embodiment.

Figure 14:
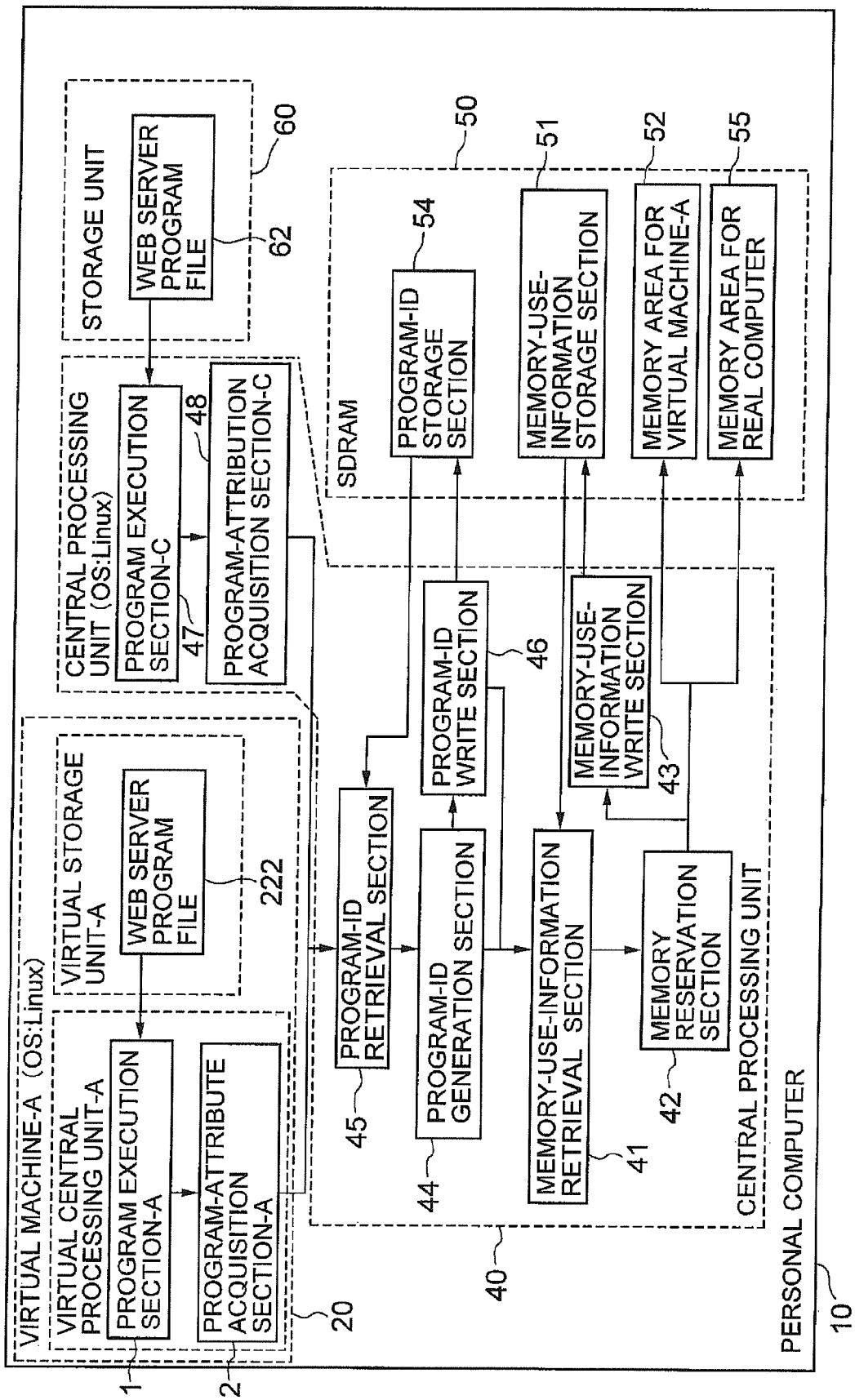
FIG. 14 is a block diagram of a memory sharing system according to a fourth example implementing the fourth embodiment.

An example will be described hereinafter. FIG. 14 shows the configuration of a memory sharing system according to a fourth example. In the fourth example, the real computer 10 is a personal computer, and the memory 50 used therein is an SDRAM. The real computer 10 includes a virtual machine-A (virtual computer-A) 20 on which Linux is running. The configuration of the virtual machine-A 20 is similar to that in the second example. The real computer 10 includes a central processing unit (data processor 40) having a function operating as a memory-use-information retrieval section 41, a memory reservation section 42, a memory-use-information write section 43, a program-ID generation section 44, a program-ID retrieval section 45, a program-ID write section 46, a program execution section C47, and a program-attribute acquisition section C48.

The SDRAM (memory 50) stores therein memory use information (memory-use-information memory area 51), a memory area for virtual machine-A (memory area 52 for virtual machine-A), a memory area for real computer (memory area 55 for real computer), and a program ID list (program-ID memory area 54). Files and the like used in the real computer 10 are stored in the storage unit 60. The Web server program file 62 stored in the storage unit 60 and Web server program file 222 stored in the virtual storage unit-A 22 are actually the same program file. This program file is entered in the same directory in the virtual storage unit-A 22 and storage unit 60, and device number "2" and i-node number "100" are assigned thereto.

As shown in FIG. 11, the program ID list 54 stores the device number and i-node number of the program file in association with the generated program ID. Further, as shown in FIG. 4, the memory use information 51 stores the program ID, request source virtual memory address, request memory size, and reserved physical memory address. In FIG. 4, two entries are registered as the memory use information. These two entries are assumed to represent a memory area assigned to the Web server running on the real computer 10.

A case is assumed where a page fault occurs in the step of executing the Web server program file 222 on the virtual machine-A 20 and therefore it is necessary to assign a memory having a size of 0x1000 to a virtual address space 0xA000 of the Web server program. In this case, the program execution section-A 211 finds the virtual memory address "0xA000" to which a memory (page) needs to be assigned in the virtual address space of the Web server program and the required memory size "0x1000", and thereafter issues a memory reservation request. The program-attribute acquisition section-A 212 acquires the device number "2" and i-node number "100" as the program-file identification information of the program that has issued the memory reservation request, and then acquires the attribute information of the program file.

The program-ID retrieval section 45 receives the program-file identification information (virtual machine "A", device number "2", and i-node number "100") from the program-attribute acquisition section-A 212 and uses the received program-file identification information as the retrieval key to retrieval the program ID list 54. The retrieval key matches the first entry in the program ID list 54 shown in FIG. 11, and the program-ID retrieval section 45 acquires the program ID "10000" of the first entry and delivers the same to the program-ID generation section 44. In this case, the program-ID generation section 44 does not generate the program ID, and delivers the received program ID to the memory-use-information retrieval section 41.

The memory-use-information retrieval section 41 uses, as the retrieval key, the program ID "10000" generated by the program-ID generation section 44, request-source memory address "0xA000", and request memory size "0x1000" to retrieval the memory use information 51, and detects whether or not the corresponding entry exits In this case, the first entry in the table of FIG. 4 matches the retrieval key. Then, the memory reservation section 42 reserves a memory area corresponding to the request memory size "0x1000" starting from the physical memory address "0x10000" described in the matched entry and performs sharing processing so as to allow the virtual machine-A 20 to use this reserved memory area.

Figure 15:
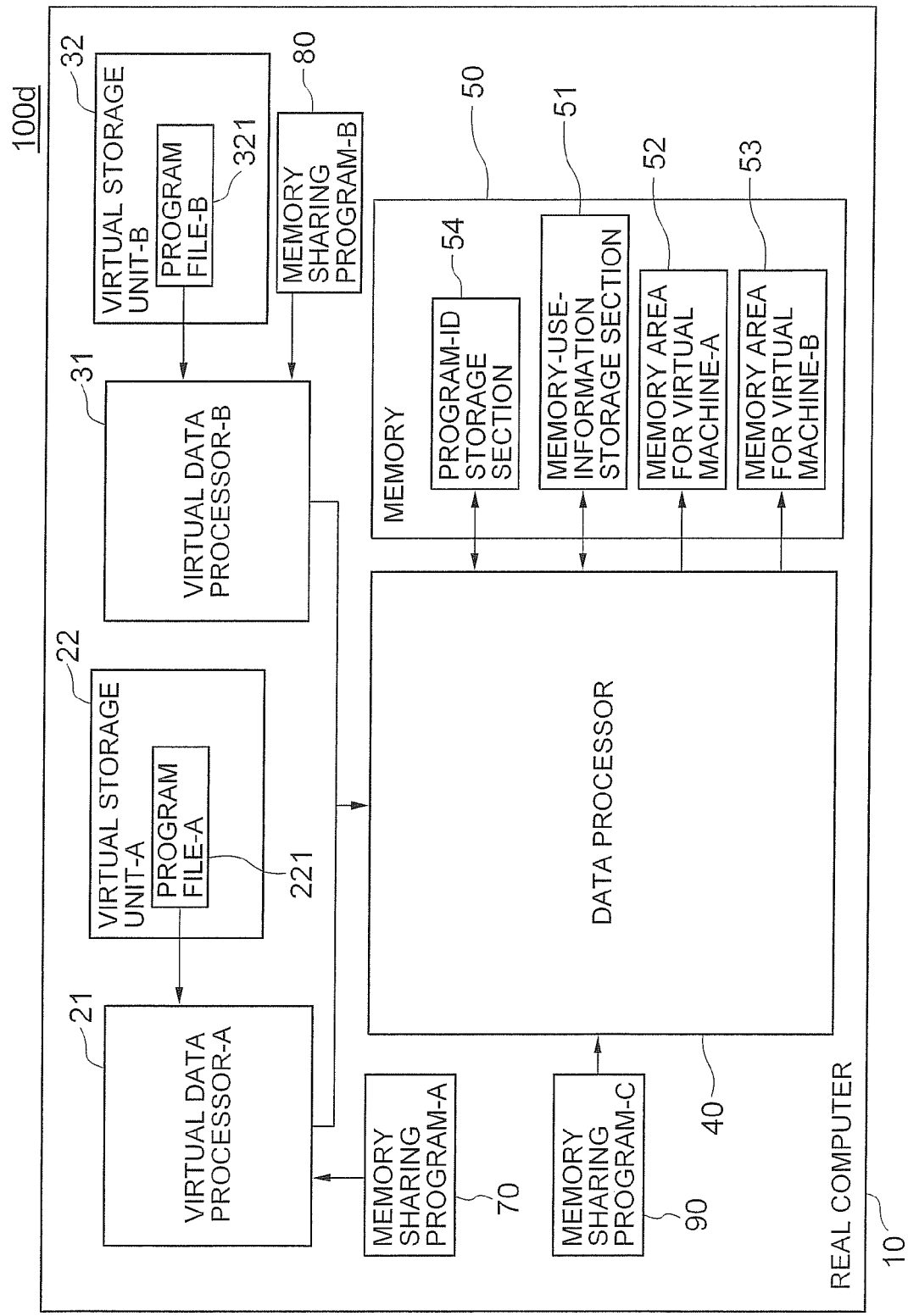
FIG. 15 is a block diagram showing the configuration of a memory sharing system according to a fifth embodiment of the present invention.

FIG. 15 shows the configuration of a memory sharing system according to a fifth embodiment of the present invention. As in the case of the first to third embodiments, a memory sharing system 100*d* according to the present embodiment includes the virtual data processor-A 21, virtual storage unit-A 22, virtual data processor-B 31, virtual storage unit-B 32, data processor 40, and memory 50. A memory sharing program-A 70 runs on the virtual data processor-A 21, and memory sharing program-B 80 runs on the virtual data processor-B 31. The virtual data processor-A 21 and virtual data processor-B 31 each perform the same processing as the virtual data processor-A 21 and virtual data processor-B 31 in the first to third embodiments under a program control.

A memory sharing program-C 90 runs on the data processor 40. The data processor 40 operates according to the memory sharing program-C 90 and performs the same processing as the data processor 40 in the first to third embodiments. The memory-use-information memory area 51, memory area 52 for virtual machine-A memory area 53 for virtual machine-B and program-ID memory area 54 are generated in the memory 50. The virtual data processor-A 21 and virtual data processor-B 31 are actually a part of the data processor 40 on the real computer 10. Accordingly, the memory sharing program-A 70 and memory sharing program-B 80 are programs running on the data processors virtually implemented on the data processor 40. Further, the virtual storage unit-A 22 and virtual storage unit-B 32 are actually the data included in the storage unit on the real computer 10.

Figure 16:
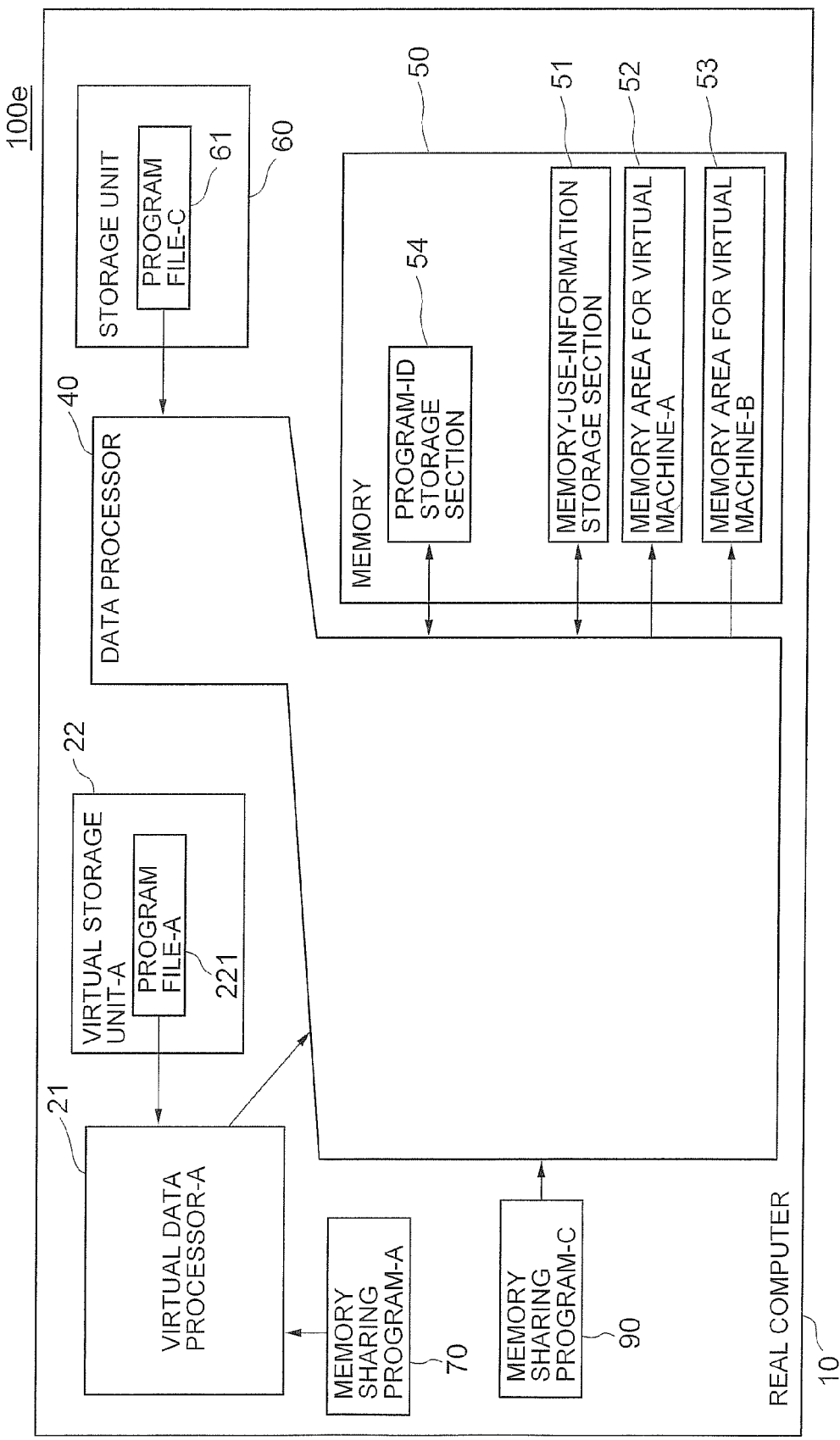
FIG. 16 is a block diagram showing the configuration of a memory sharing system according to a sixth embodiment of the present invention.

FIG. 16 shows the configuration of a memory sharing system according to a sixth embodiment of the present invention. As in the case of the fourth embodiment, a memory sharing system 100*e* according to the present embodiment includes the virtual data processor-A 21, virtual storage unit-A 22, data processor 40, memory 50, and storage unit 60. A memory sharing program-A 70 runs on the virtual data processor-A 21. The virtual data processor-A 21 performs the same processing as the virtual data processor-A 21 in the fourth embodiment under a program control. The memory sharing program-C 90 runs on the data processor 40. The data processor 40 performs the same processing as the data processor 40 in the fourth embodiment under a program control. The memory-use-information memory area 51, memory area 52 for virtual machine-A, program-ID memory area 54, and memory area 55 for real computer are generated in the memory 50.

When the program ID of a program which is a target of the memory reservation request is stored in the memory-use-information memory area, a memory area into which the target program has been loaded is shared so as to allow a computer that has issued the memory reservation request to refer to the memory area. With this configuration, when the same program runs on a plurality of computers, a program file loaded into a memory can be shared between the plurality of computers. This reduces the memory use amount to effectively utilize a memory resource.

The present invention can be applied to a memory sharing system for sharing a memory area between different OSes in a virtual machine environment where a plurality of different OSes run on the single real computer and to a program for realizing the memory sharing system.

What is claimed is:

1. A memory sharing system comprising:
a plurality of computers;
a main or primary memory including a plurality of memory areas assigned to respective said computers, said memory areas each being capable of loading thereon a program for operating a corresponding one of said computers;
a memory-use-information memory area that stores therein association of a program ID of a loaded program with one of said memory areas loading said loaded program;
a memory-use-information retrieval section that judges, upon issuing of a memory reservation request identifying a specific program from one of said computers, whether or not a specific program ID specifying said specific program is stored in said memory-use-information memory area; and
a memory reservation section that allows, if said memory-use-information retrieval section judges existence of said specific program ID in said memory-use-information memory area, one of said memory areas loading thereon said specific program to be shared simultaneously among said plurality of computers, said plurality of computers simultaneously sharing said one of said memory areas.

2. The memory sharing system according to claim 1, further comprising a memory-use-information write section, wherein:
if said memory-use-information retrieval section judges absence of said specific program ID in said memory-use-information memory area, said memory reservation section loads said specific program into another of said memory areas assigned to said one of said computers that has issued said memory reservation request, and allows said memory-use-information write section to store said specific program ID in said memory-use-information memory area.

3. The memory sharing system according to claim 2, wherein:
said memory-use-information write section associates said specific program ID, a request-source memory address representing an address of a specific position in said specific program to be loaded, and a request memory size representing a memory size of said specific program with a head memory address in said another of said memory areas, for storing said associated information in said memory-use-information memory area.

4. The memory sharing system according to claim 3, wherein:
said memory reservation request includes a request-source memory address and a request memory size, and said memory-use-information retrieval section uses, as a retrieval key, said specific program ID of said specific program, said request-source memory address and said request memory size included in said memory reservation request to retrieval said memory-use- information memory area so as to judge whether or not an entry that matches said retrieval key exists in said memory-use-information memory area.

5. The memory sharing system according to claim 4, wherein:
if said memory-use-information retrieval section judges that an entry matching said retrieval key exists, said memory reservation section reserves a portion of said one of said memory areas corresponding to said request memory size starting from said head memory address stored in said entry that matches said retrieval key, and performs a sharing processing so as to allow said one of said computers that has issued said memory reservation request to refer to said shared one of said memory areas.

6. The memory sharing system according to claim 3, wherein said one of said computers comprises a program execution section that acquires, if said one of said computers executes a program to find a necessity to load a specific program into a corresponding one of said memory areas, a request-source memory address and a request memory size to issue said memory reservation request.

7. The memory sharing system according to claim 1, further comprising an attribute information acquisition section for acquiring attribute information of said specific program to be loaded, and a program-ID generation section for generating said program ID based on said attribute information.

8. The memory sharing system according to claim 7, wherein:
said attribute information acquisition section identifies a program file based on program- file identification information including an identifier assigned for uniquely identifying a program file of the program in said one of said computers and acquires said attribute information of said program file.

9. The memory sharing system according to claim 8, further comprising a program-ID retrieval section for referring to a program-ID memory area that stores therein said identifier of said one of said computers that has issued said memory reservation request, program-file identification information, and program ID in association with each other, to determine whether or not a program ID corresponding to said program file identified by said attribute information acquisition section is stored in said program-ID memory area, wherein:
if said program-ID retrieval section determines that a program ID corresponding to said program file identified by said attribute information acquisition section is stored, said program-ID generation section acquires said program ID stored in said program-ID memory area instead of generating a program ID.

10. The memory sharing system according to claim 9, wherein:
if said program-ID retrieval section determines that a program ID corresponding to said program file identified by said attribute information acquisition section is not stored, said program-ID generation section allows said program-ID write section to store said program ID generated based on said attribute information in said program-ID memory area in association with said identifier of said one of said computers and said program-file identification information.

11. The memory sharing system according to claim 1, wherein:
said computers include a plurality of virtual machines running on a real computer, and
said memory reservation section allows one of said memory areas reserved for one of said virtual machines, into which said specific program has been loaded, to be shared between at least two of said plurality of virtual machines.

12. The memory sharing system according to claim 1, wherein:
said computers include a real computer and a virtual machine running on said real computer, and
said memory reservation section allows one of said memory areas reserved for said real computer or virtual machine, into which said specific program has been loaded, to be shared between said real computer and at least one of said virtual machines.

13. A memory sharing method for sharing a memory area of a main or primary memory between a plurality of computers, said memory including a plurality of memory areas assigned to respective said computers, said memory areas each being capable of loading thereon a program for operating a corresponding one of said computers, said method comprising:

judging, upon issuing of a memory reservation request identifying a specific program from one of said computers, whether or not a specific program ID specifying said specific program is stored in a memory-use-information memory area, which stores therein association of a program ID of a loaded program with one of said memory areas loading thereon said loaded program; and allowing, if said judging judges existence of said specific program ID in said memory-use-information memory area, one of said memory areas loading thereon said specific program to be shared simultaneously among said plurality of computers, said plurality of computers simultaneously sharing said one of said memory areas.

14. The memory sharing method according to claim 13, further comprising:

loading, if said memory-use-information retrieval section judges absence of said specific program ID in said memory-use-information memory area, said specific program into another of said memory areas assigned to said one of said computers that has issued said memory reservation request; and storing said specific program ID in said memory-use-information memory area.

15. The memory sharing method according to claim 14, further comprising:

associating said specific program ID, a request-source memory address representing an address of a specific position in said specific program to be loaded, and a request memory size representing a memory size of said specific program with a head memory address in said another of said memory areas to create associated information, to store said associated information in said memory-use-information memory area.

16. The memory sharing method according to claim 15, wherein:

said memory reservation request includes a request-source memory address and a request memory size, and said memory-use-information retrieving uses, as a retrieval key, said specific program ID of said specific program, said request-source memory address and said request memory size included in said memory reservation request to retrieval said memory-use-information memory area so as to judge whether or not an entry that matches said retrieval key exists in said memory-use-information memory area.

17. The memory sharing method according to claim 16, wherein:

if said memory-use-information retrieving judges that an entry matching said retrieval key exists, said allowing renders said one of said computers that has issued said memory reservation request to refer to a portion of said memory areas corresponding to said request memory size starting from said head memory address stored in said entry that matches said retrieval key.

18. The memory sharing method according to claim 13, further comprising acquiring attribute information of said specific program to be loaded, to generate said program ID based on said attribute information.

19. The memory sharing method according to claim 18, wherein:

said attribute information acquiring identifies a program file based on program-file identification information that includes an identifier assigned for uniquely identifying a program file of any program in said computers and acquires said attribute information of said program file of said specific program.

20. The memory sharing method according to claim 19, further comprising referring to a program-ID memory area that stores therein said identifier of said one of said computers that has issued said memory reservation request, and program-file identification information and program ID of said specific program in association with each other, to determine whether or not a program ID corresponding to said program file identified by said attribute information acquisition section is stored in said program-ID memory area, wherein:

if said referring to said program-ID retrieval section determines that a program ID corresponding to said program file identified by said attribute information acquisition section is stored, a program ID stored in said program-ID memory area is acquired instead of generating said program ID.

21. The memory sharing method according to claim 20, wherein:

if said referring to said program-ID retrieval section determines that a program ID corresponding to said program file identified by said attribute information acquisition section is not stored, a program ID is generated based on said attribute information and stored in said program-ID memory area in association with said identifier of said one of said computers and said program-file identification information.

22. The memory sharing method according to claim 13, wherein:

said computers include a plurality of virtual machines running on a real computer, and said real computer allows one of said memory areas reserved for one of said virtual machines, into which said specific program has been loaded, to be shared between at least two of said plurality of virtual machines.

23. The memory sharing system according to claim 13, wherein:

said computers include a real computer and a virtual machine running on said real computer, and said real computer allows one of said memory areas reserved for said real computer or virtual machine, into which said specific program has been loaded, to be shared between said real computer and at least one of said virtual machines.

24. A computer readable medium encoded with a sharing program running on a CPU for executing sharing of a program loaded into a main or primary memory among a plurality of computers, said memory including a plurality of memory areas assigned to respective said computers, said memory areas each being capable of loading thereon a program for operating a corresponding one of said computers, said program being capable of causing said CPU to:

judge, upon issuing of a memory reservation request identifying a specific program from one of said computers, whether or not a specific program ID specifying said specific program is stored in a memory-use-information storage, which stores therein association of a program ID of a loaded program with one of said memory areas loading said loaded program; and allow, if it is judged that said specific program ID is stored in said memory-use-information memory area, one of said memory areas loading thereon said specific program to be shared simultaneously among said plurality of computers, said plurality of computers simultaneously sharing said one of said memory areas.

25. The computer readable medium according to claim 24, wherein said program being capable of causing said CPU to:

load, if it is judged that said specific program ID is not stored in said memory-use- information memory area, said specific program into another of said memory areas assigned to said one of said computers that has issued said memory reservation request; and store said specific program ID in said memory-use-information memory area.

26. The computer readable medium according to claim 25, wherein said program being capable of causing said CPU to:

associate said specific program ID, a request-source memory address representing an address of a specific position in said specific program to be loaded, and a request memory size representing a memory size of said specific program with a head memory address in said another memory area to create associated information, to store said associated information in said memory-use-information memory area.

27. The computer readable medium according to claim 26, wherein:

said memory reservation request includes a request-source memory address and a request memory size, and said memory-use-information retrieving uses, as a retrieval key, said specific program ID of said specific program, said request-source memory address and said request memory size included in said memory reservation request to retrieval said memory-use-information memory area so as to judge whether or not an entry that matches said retrieval key exists in said memory-use-information memory area.

28. The computer readable medium according to claim 27, wherein:

if it is judged that an entry that matches said retrieval key exists, said one of said computers that has issued said memory reservation request is allowed to refer to a portion of said memory areas corresponding to said request memory size starting from said head memory address stored in said entry that matches said retrieval key.

29. The computer readable medium according to claim 24, wherein said program being capable of causing said CPU to:

acquire attribute information of said specific program to be loaded, to generate said program ID based on said attribute information.

30. The computer readable medium according to claim 29, wherein:

said acquirement of attribute information identifies a program file based on program-file identification information that includes an identifier assigned for uniquely identifying a program file of any program in said computers and acquires said attribute information of said program file of said specific program.

31. The computer readable medium according to claim 30, said program being capable of causing said CPU to:

refer to a program-ID memory area that stores therein said identifier of said one of said computers that has issued said memory reservation request, program-file identification information, and program ID in association with each other, to determine whether or not a program ID corresponding to said program file identified by said attribute information acquisition is stored in said program-ID memory area, wherein:

if it is determined that a program ID corresponding to said program file identified by said attribute information acquisition is stored, a program ID stored in said program-ID memory area is acquired instead of generating said program ID.

32. The computer readable medium according to claim 31, wherein:

if it is determined that a program ID corresponding to said program file identified by said attribute information acquisition is not stored, a program ID is generated based on said attribute information and stored in said program-ID memory area in association with said identifier of said one of said computers and said program-file identification information.

33. The computer readable medium according to claim 24, wherein:

said computers include a plurality of virtual machines running on a real computer configuring said CPU, and said real computer allows one of said memory areas reserved for one of said virtual machines, into which said specific program has been loaded, to be shared between at least two of said plurality of virtual machines.

34. The computer readable medium according to claim 24, wherein:

said computers include a real computer configuring said CPU and a virtual machine running on said CPU, and said CPU allows one of said memory areas reserved for said real computer or virtual machine, into which said specific program has been loaded, to be shared between said real computer and at least one of said virtual machines.

* * * * *